US005549344A

United States Patent [19]

Nishijima et al.

[11] Patent Number: 5,549,344

[45] Date of Patent: Aug. 27, 1996

[54] STRUCTURE OF INSTRUMENT PANEL PORTION FOR USE IN VEHICLES

[75] Inventors: Takayuki Nishijima; Kanehiro Kawamachi; Takao Muto; Mitsuo Yamazaki; Toshiyuki Arima, all of Omiya, Japan

[73] Assignee: Kansei Corporation, Saitama-ken, Japan

[21] Appl. No.: 438,667

[22] Filed: May 10, 1995

Related U.S. Application Data

[62] Division of Ser. No. 242,815, May 16, 1994.

[30] Foreign Application Priority Data

Apr. 14, 1993 [JP] Japan .................................... 6-75926
May 14, 1993 [JP] Japan .................................... 5-113201

[51] Int. Cl.$^{6}$ .................................... B62D 25/14

[52] U.S. Cl. .................................... 296/70; 180/90; 439/34

[58] Field of Search .................................... 296/70, 72, 74, 296/194, 208; 180/90; 439/34

[56] References Cited

U.S. PATENT DOCUMENTS

| | | | |
|---|---|---|---|
| 3,724,357 | 4/1973 | Kavthekar et al. . | |
| 4,227,239 | 10/1980 | Boyer et al. . | |
| 4,733,739 | 3/1988 | Lorenz et al. . | |
| 4,910,641 | 3/1990 | Yanase | 296/70 |
| 4,942,499 | 7/1990 | Shibata et al. . | |
| 4,943,241 | 7/1990 | Watanabe et al. . | |
| 5,088,571 | 2/1992 | Burry et al. . | |

FOREIGN PATENT DOCUMENTS

| | | |
|---|---|---|
| 59-213524 | 12/1984 | Japan . |
| 60-191832 | 9/1985 | Japan . |
| 62-113633 | 5/1987 | Japan . |
| 63-219446 | 9/1988 | Japan . |
| 1-190551 | 7/1989 | Japan . |

*Primary Examiner*—Dean Kramer
*Attorney, Agent, or Firm*—Keck, Mahin & Cate

[57] ABSTRACT

A base member is laid in a space portion, which is defined by an instrument panel, in a vehicle width direction over a generally entire width of the vehicle, and a plurality of ducts is integrally formed with the base member. Furthermore, a meter placing portion, on which a meter is placed, and an air bag placing portion, on which an air bas is placed, are formed on the base member, and a harness placing portion 26, on which a flat harness is placed, is also formed on the base member in the vehicle width direction. Accordingly, the base member with which the plurality of ducts is integrally formed is a separate body from the instrument panel. Even in the case where the size of the instrument panel is changed, the base member is not required to correspond to the instrument panel and, therefore, the ducts can be commonly used. Moreover, since the base member is formed with ducts each having a closed structure, in section, it has a predetermined physical strength. Since this base member is laid in the vehicle width direction over a generally entire width of the vehicle, that portion of the vehicle body where the instrument panel is arranged is increased in physical strength owing to the provision of this base member for the sake of a possible side crush or collision of the vehicle.

7 Claims, 22 Drawing Sheets

A
A
B
B
C
C
D
D
13
15
15a
16
16a
16a
17
17a
18
18a
19
19a
20
20a
23
24
26
27
27

35
37
40
17a
11
14
41
19a
19
17
13

14
33
15a
15
19
17
13
45
21
25
44
44
23a
23
11

14
51
25
24a
22
46
11
50
12
24
13
18
20
47
13a
14a
49
48

14
37
35
33
36
38
15
15a
16
16a
17
17a
19
19a
20
20a
21
22
23
24
25
26
52
13

56
57
58
58a
59
59a
60
60a
61
61a
62
62a
63
64
66
67
68
69
69a
70
70a
71
71a
71b
71c
72
73
75
75b
76
77a
77b
78a
78b
79
95
97
98

59a
61a
61
77
59
58a
63
58
63
57
64
57
60
60a
62
62a 68b
68a
68b
75b
75c
68a
62b
75f
68b
75g
75e
68
75f
68b
68a
75
68b
75g
75f
75g

STRUCTURE OF INSTRUMENT PANEL PORTION FOR USE IN VEHICLES

This is a Divisional of application Ser. No. 08/242,815, filed May 16, 1994.

BACKGROUND OF THE INVENTION

1. Field of the Invention

This invention relates to a structure of an instrument panel portion which is to be set up on the front side of a front seat of a vehicle.

2. Description of the Prior Art

Conventional structures of an instrument panel portion for use in vehicles, of the type mentioned above, are disclosed, for example, in Japanese Laid-Open Patent Publication Nos. Sho 48-64646 (U.S. Pat. No. 3,724,357) and Hei 1-190551 as illustrated in FIGS. 25 and 26, respectively.

In the structure of FIG. 25, crush pads 2 are provided on an upper surface portion and an upper front surface portion of an instrument panel 1, and a duct 3 is integrally formed with this instrument panel 1.

Similarly, in the structure of FIG. 26, an instrument panel body 5 comprises half-split panels, i.e., an upper instrument panel portion 6 and a lower instrument panel portion 7. A groove 9 for guiding and receiving a wire harness 8 is formed in the lower instrument panel portion 7.

The conventional structure of FIG. 25 has the following problems. Since the duct 3 is integral with the instrument panel 1, it is necessary to change the configuration of the duct 3 whenever a model or type of the vehicle is changed, in accordance with a new instrument panel of that vehicle because instrument panels are usually different in width, etc. for each model or type of vehicles. This means that the duct 3 must be redesigned (or newly designed) and manufactured for each model or type of vehicles.

Similarly, the conventional structure of FIG. 26 has the following problems. Although the workability of wiring or arranging operation of a wire harness 8 is good compared with one in which the wire harness is arranged on a vehicle body side, workability is bad with respect to ducts because a plurality of split ducts must be connected. Besides, whenever the size of the instrument panel body 5 is changed, it is necessary to change or redesign the configuration of the duct in accordance with the change of the size of the instrument panel body 5, as in the above-mentioned prior art.

Furthermore, in the above-mentioned two conventional examples, it is difficult to say that workability is good because various electric equipments such as a meter, etc., must be individually arranged.

SUMMARY OF THE INVENTION

It is an object of the present invention to provide a structure of an instrument panel portion which is capable of increasing the physical strength of a side body of a vehicle for the sake of a possible side crush or collision of the vehicle.

Another object of the invention is to enhance the working performance or workability of arranging operation of various electric equipments such as a meter.

A further object of the invention is to reduce an impact to a passenger(s), as well as a driver, of a vehicle at the time when a vehicle collision occurs.

A still further object of the invention is to enhance a smooth flow of air in a duct so that the air will be smoothly blown off through blow-off ports.

A yet further object of the invention is to facilitate an easy wiring/exchanging operation of a wire harness, etc.

An additional object of the invention is to enhance the working performance or workability of arranging operation of various electronic parts.

Therefore, according to one feature of the present invention, a base member is arranged in a space portion, which is defined by an instrument panel, in a vehicle width direction over a generally entire width of the vehicle, and a plurality of ducts are integrally formed with the base member.

According to another feature of the invention, a base member is disposed in a space portion, which is defined by an instrument panel, in a vehicle width direction over a generally entire width of the vehicle, and a plurality of ducts, an electric equipment placing portion, on which various electric equipments are placed or installed), and a harness placing portion (on which a harness is placed or installed) are integrally formed with the base member along the width direction of the vehicle.

According to another feature of the invention, a selected one of the ducts of the base member is disposed through a rear part of the vehicle from the electric equipment placing portion.

According to another feature of the invention, the plurality of ducts includes a center duct disposed at a central portion in the width direction of the vehicle and having a blow-off port for blowing off air backwardly, a right-side ventilation duct continuously extending from one side of the center duct and having a blow-off port at a distal end thereof, and a left-side ventilation duct continuously extending from the other side of the center duct and having a blow-off port at a distal end thereof, air drawn upwardly from a lower side of the center duct being blown off from the blow-off port of the center duct and the blow-off ports of the right- and left-side ventilation ducts, a V-shaped groove being formed in an upper surface side of the center duct in such a manner as to project downwardly and extend in a forward and backward direction of the vehicle, the air drawn into the center duct from below being branched toward the right-side ventilation duct and the left-side ventilation duct by the V-shaped groove.

According to another feature of the present invention, the harness placing portion is formed on a vehicle rear side edge portion of the base member.

According to another feature of the present invention, a connector is disposed at a location in the vicinity of an end portion of the harness placing portion for the harness to be placed on the harness placing portion of the base member.

According to another feature of the present invention, a harness protector with the harness received therein is removably mounted on the harness placing portion of the base member.

According to another feature of the present invention, a rotatable cover for covering the harness placed on the harness placing portion is integrally formed with the harness placing portion of the base member.

According to another feature of the present invention, a mounting bracket portion to be mounted with electronic parts is disposed on an end portion of the harness placing portion of the base member in a direction of the width of the vehicle.

According to another feature of the present invention, the electric equipment placing portion is formed on opposite sides of the base member with a vehicle central portion therebetween, and a meter or an air bag device for an assistant driver's seat can be placed on the electric equipment placing portion on either side.

According to another feature of the present invention, the base member is integrally formed by blowing and the duct blow-off ports are opened after the base member is integrally formed by blowing.

According to another feature of the present invention, a plurality of portions of the base member is separately formed by a low pressure injection molding method and the base member is formed by completion of the solvent-welding of these portions.

According to another feature of the present invention, the base member is mounted on a steering member which is disposed along the vehicle width direction and whose opposite end portions are attached to the vehicle body.

According to another feature of the present invention, a plurality of grilles is arranged on the instrument panel, and those grilles and the duct blow-off ports are connected through connecting pipes, respectively.

According to another feature of the present invention, the connecting pipes are flexible.

DETAILED DESCRIPTION OF THE INVENTION

Figure 1:
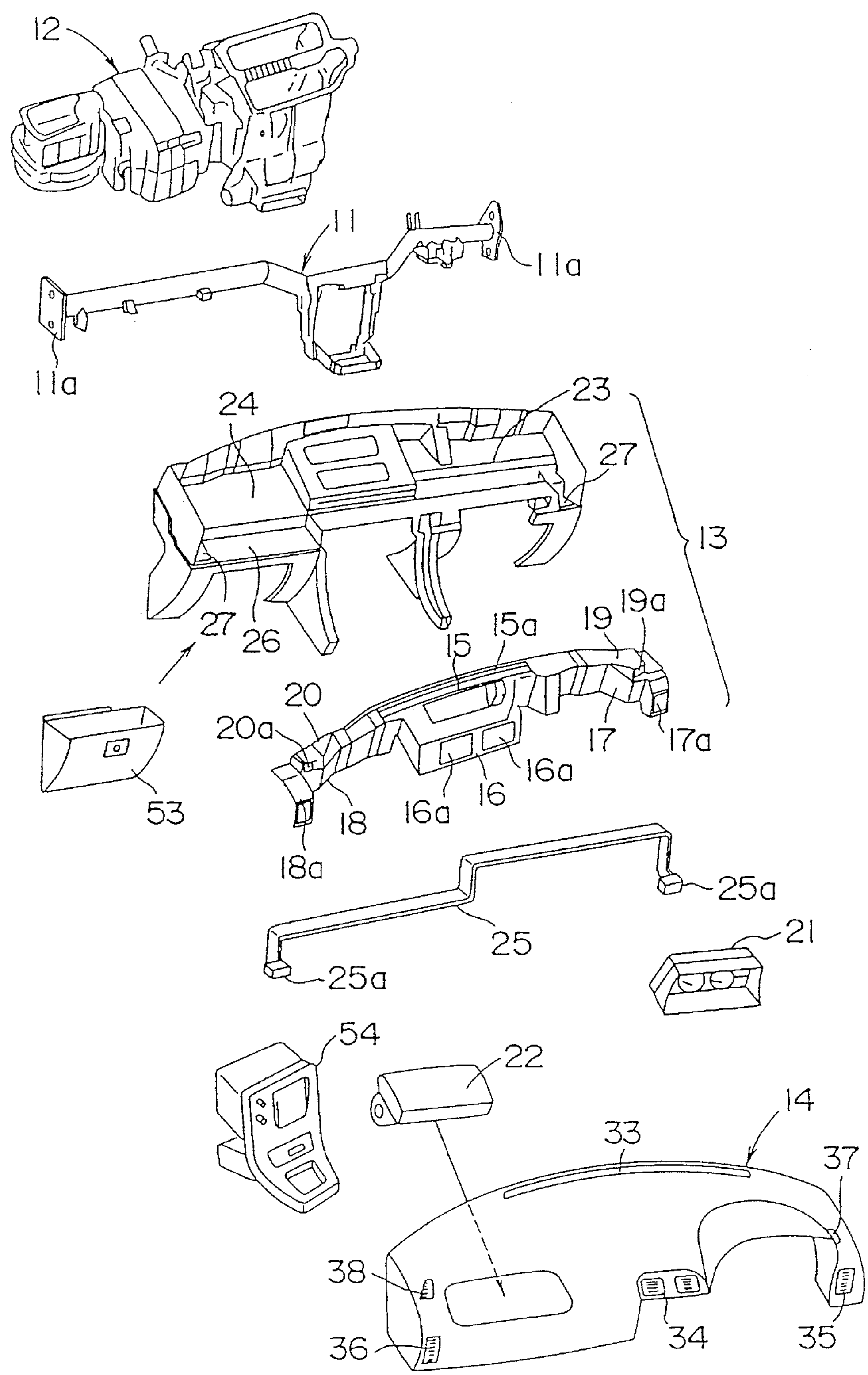
FIG. 1 is an exploded perspective view according to a first embodiment of the present invention.

The present invention will be described hereinafter with reference to the embodiments illustrated in the accompanying drawings.

FIGS. 1 to 8 show a first embodiment of the present invention.

A construction will be described first. In the Figures, reference numeral 11 denotes a steering member 11. The steering member 11 is provided at opposite end portions thereof with brackets 11*a*, respectively and the brackets 11*a* are secured to dash side panels 95 (see FIGS. 10 and 13) of a vehicle body by bolts 96, thereby the steering member 11 is disposed in a vehicle width direction.

Then, a base member (assembly) 13 is attached to the steering member 11 and an air conditioning unit 12 is supported on the steering member 11, these being all covered with an instrument panel 14. In other words, the base member 13, etc. are disposed in a space portion which is defined by the instrument panel 14.

Figure 2:
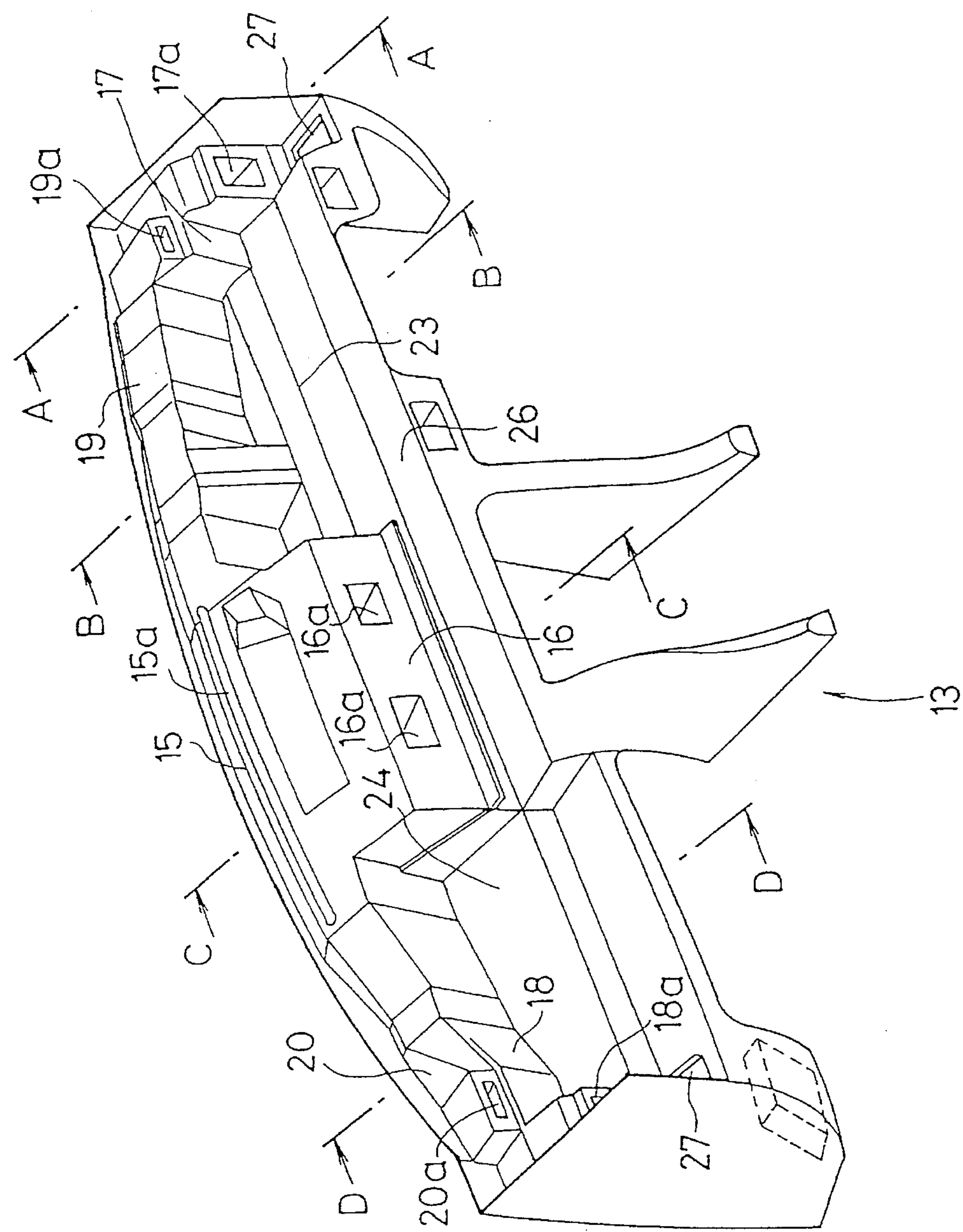
FIG. 2 is a perspective view of a base member according to the above embodiment.
Figure 3:
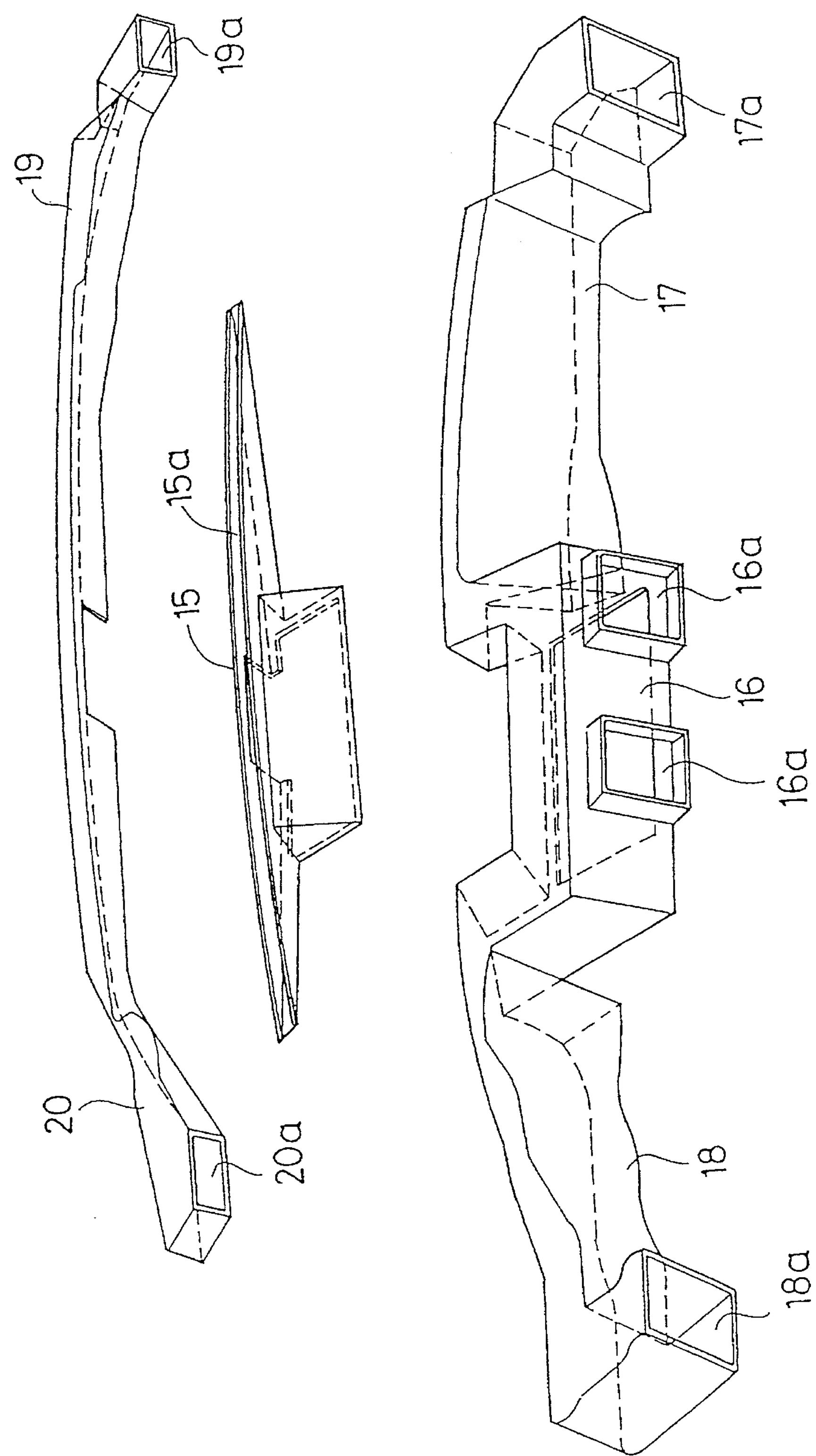
FIG. 3 is a perspective view showing a plurality of ducts of the base member according to the above embodiment in an exploded state.
Figure 8:
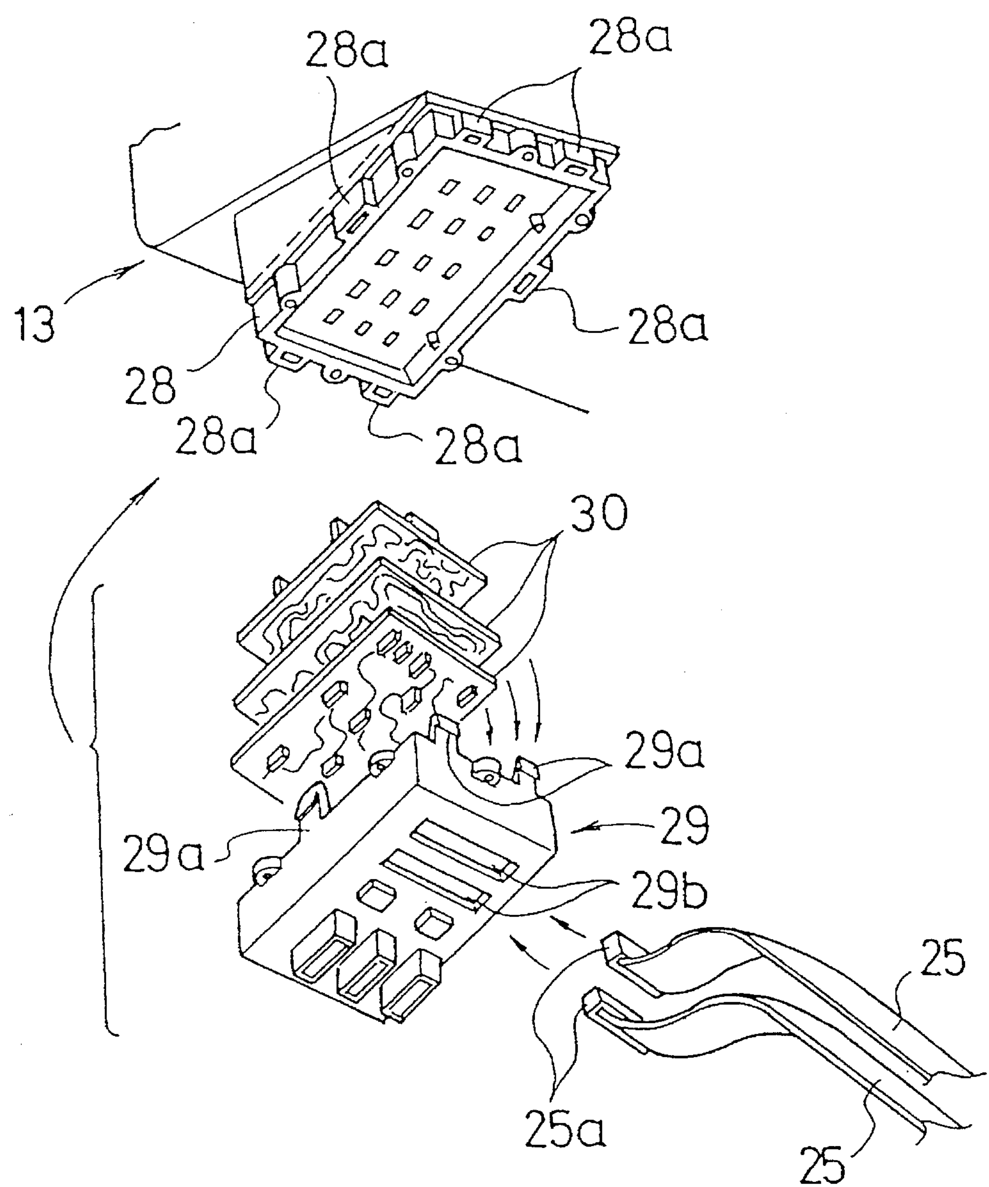
FIG. 8 is an exploded perspective view showing an upper case, a lower case, a flat harness, etc. according to the above embodiment.

Integrally formed with the base member 13 are a front defroster duct 15, a center duct 16, a right-side ventilation duct 17, a left-side ventilation duct 18, a right-side defroster duct 19, and a left-side defroster duct 20 (see FIGS. 2 and 8, as well as elsewhere). FIG. 3 shows these ducts 15 to 20 in an exploded state only for the sake of easy understanding. Actually, however, these ducts 15 to 20 are individually partitioned by a single wall and integrally formed with the base member 13.

A meter placing portion 23 and an air bag placing portion 24 as an "electric equipment placing portion", on which a meter 21 and an air bag device 22 as "electric equipments" are placed, are formed on the base member 13. A harness placing portion 26, on which a flat harness 25 is placed, is formed on a vehicle rear side edge portion over the entire vehicle width. The harness placing portion 26 is provided with openings 27 which are formed in opposite end portions of the harness placing portion 26. Male connectors 25*a*, which are provided on opposite end portions of the flat harness 25, are passed through and extend downwardly of the openings 27. A round wire harness may of course be placed on the harness placing portion 26.

As shown in FIG. 8, a case upper portion 28 is integrally formed with a lower surface side of the base member 13 at a location in the vicinity of each opening 27, and a case lower portion 29 is detachably attached to the case upper portion 28. A plurality of circuit boards 30 is received in a space formed between the case upper portion 28 and the case lower portion 29 attached to the case upper portion 28. Claw portions 29*a* are integrally formed with the case lower portion 29 in a manner so as to be projecting upwardly. Engagement portions 28*a* are formed in the case upper portion 28 so that the claw portions 29*a* will be inserted and engaged in the engagement portions 28*a*, respectively. The case lower portion 29 is provided with female connectors 29*b*, into which the male connectors 25*a* of the flat harnesses 25 are fitted respectively.

In this embodiment, as shown in FIG. 1, the base member 13 is constructed by separately forming the ducts 15 to 20 side and the placing portions 23 and 24 side by the low pressure injection molding method, and thereafter, they are welded by hot plate heat welding (a method for heating the face-to-face portions with a hot plate so as to be welded), vibration welding, supersonic welding, or the like. The low pressure injection molding method is disclosed in Japanese Patent Publication No. Hei 2-58089, Japanese Laid-Open Patent Publication No. Sho 59-49916, Japanese Patent Publication No. Sho 63-66651, etc.

Since the thickness management can be performed with high accuracy in accordance with the above low pressure injection molding method, a plate can be formed thin with high accuracy. Accordingly, the base member 13 can be made light in weight and reduced in material cost.

As shown in FIG. 1, a front defroster grille 33, a center grille 34, a right-side ventilation grille 35, a left-side ventilation grille 36, a right-side defroster grille 37, and a left-side defroster grille 38 are arranged on the instrument panel 14. These grilles 33 to 38 are connected to the blow-off ports 15*a* to 20*a* of the ducts 15 to 20, respectively, in the manner as will be described hereinafter.

Figure 4:
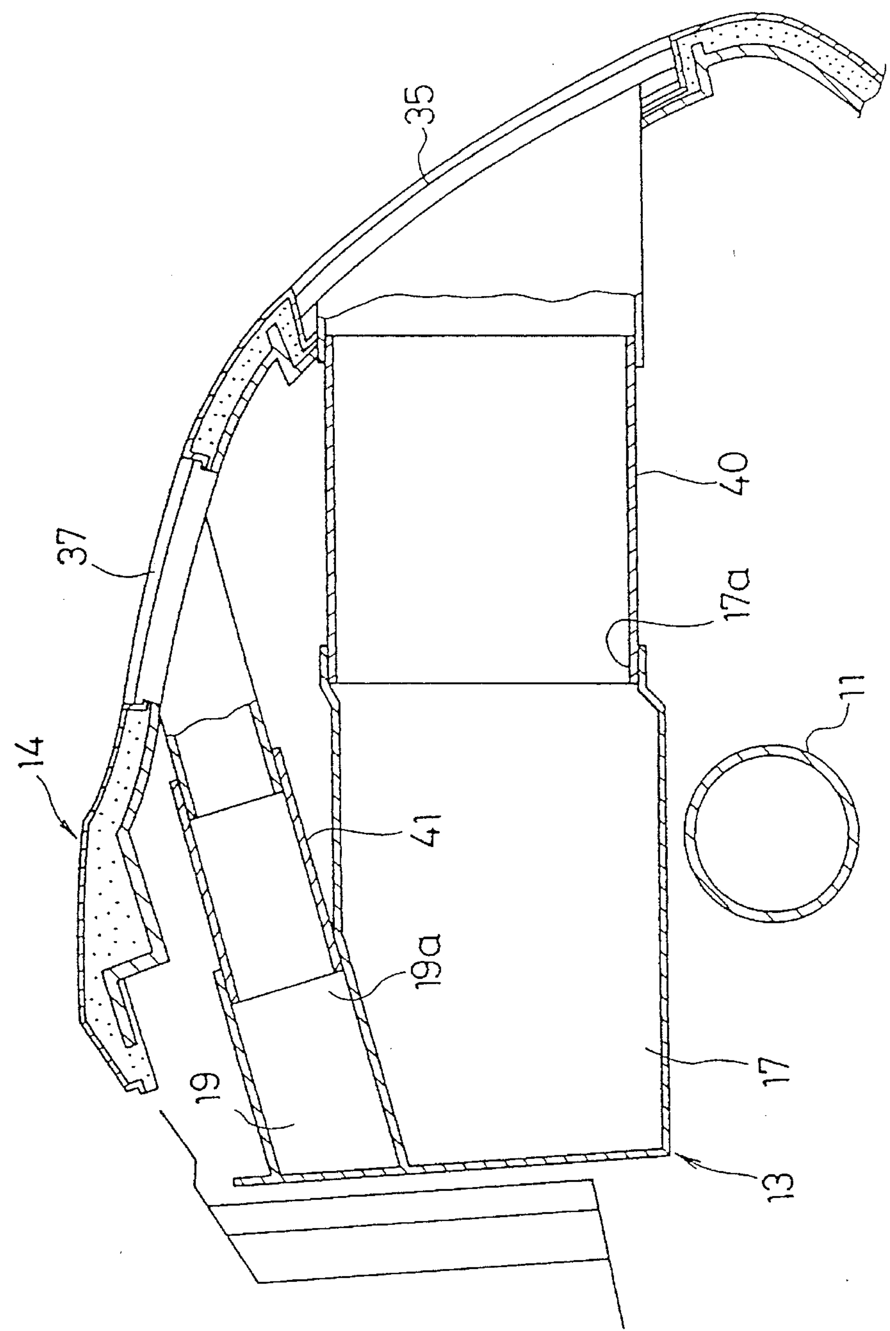
FIG. 4 is a sectional view taken on line A—A of FIG. 2.

As shown in FIG. 4, the right-side ventilation grille 35 is connected to the blow-off port 17*a* of the right-side ventilation duct 17 through a connecting pipe 40, while the right-side defroster grille 37 is connected to the right-side defroster duct 19 through a connecting pipe 41. Since the connection relation between the left-side ventilation grille 36 and the left-side defroster grille 38 is the same as the right-side, a description thereof is omitted.

Figure 5:
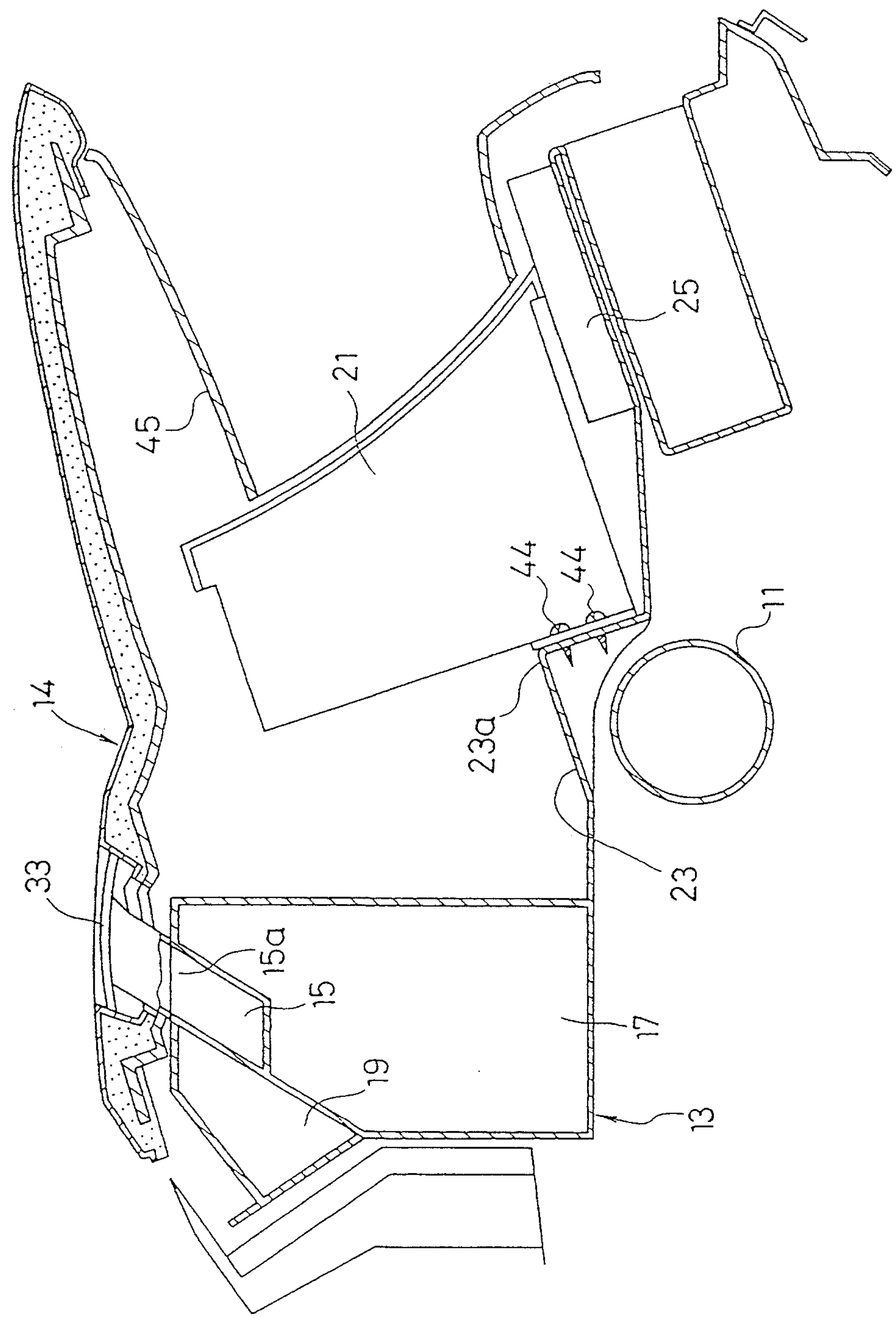
FIG. 5 is a sectional view taken on line B—B of FIG. 2.
Figure 6:
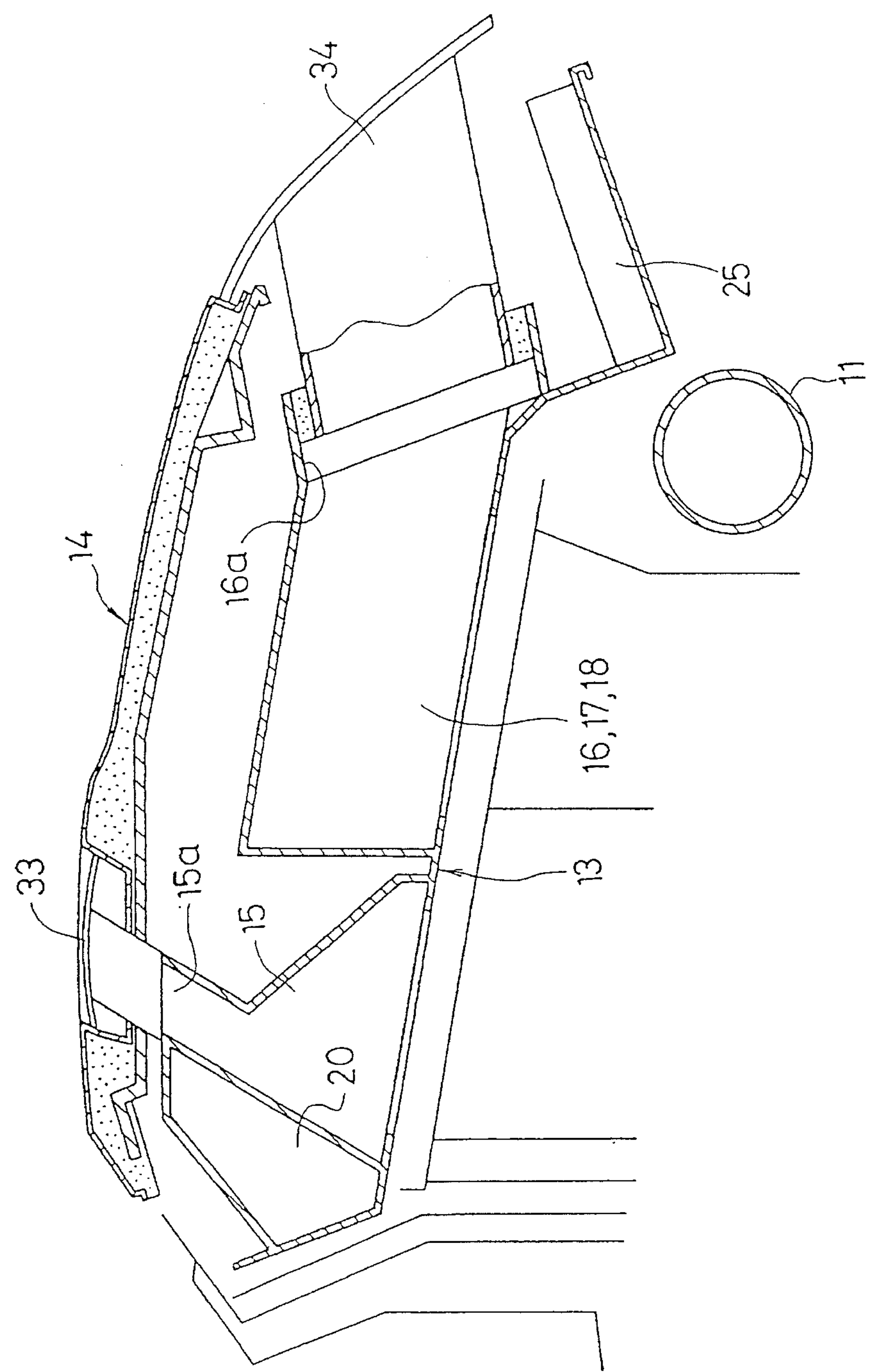
FIG. 6 is a sectional view taken on line C—C of FIG. 2.

The front defroster grille 33 is connected to the blow-off port 15*a* of the front defroster duct 15 as shown in FIG. 5, while the center grille 34 is connected to the blow-off port 16*a* of the center duct 16 as shown in FIG. 6.

As shown in FIG. 5, the meter 21 is fixed to a mount portion 23*a* which is formed on the meter placing portion 23 of the base member 13 by screws 44, and a lid 45 is disposed between the meter 21 and an opening portion of the instrument panel 14. The air bag device 22 and a mount portion 24*a* formed on the air bag placing portion 24 of the base member 13 are commonly fastened to the steering member 11 by a bolt 46 as shown in FIG. 7.

Figure 7:
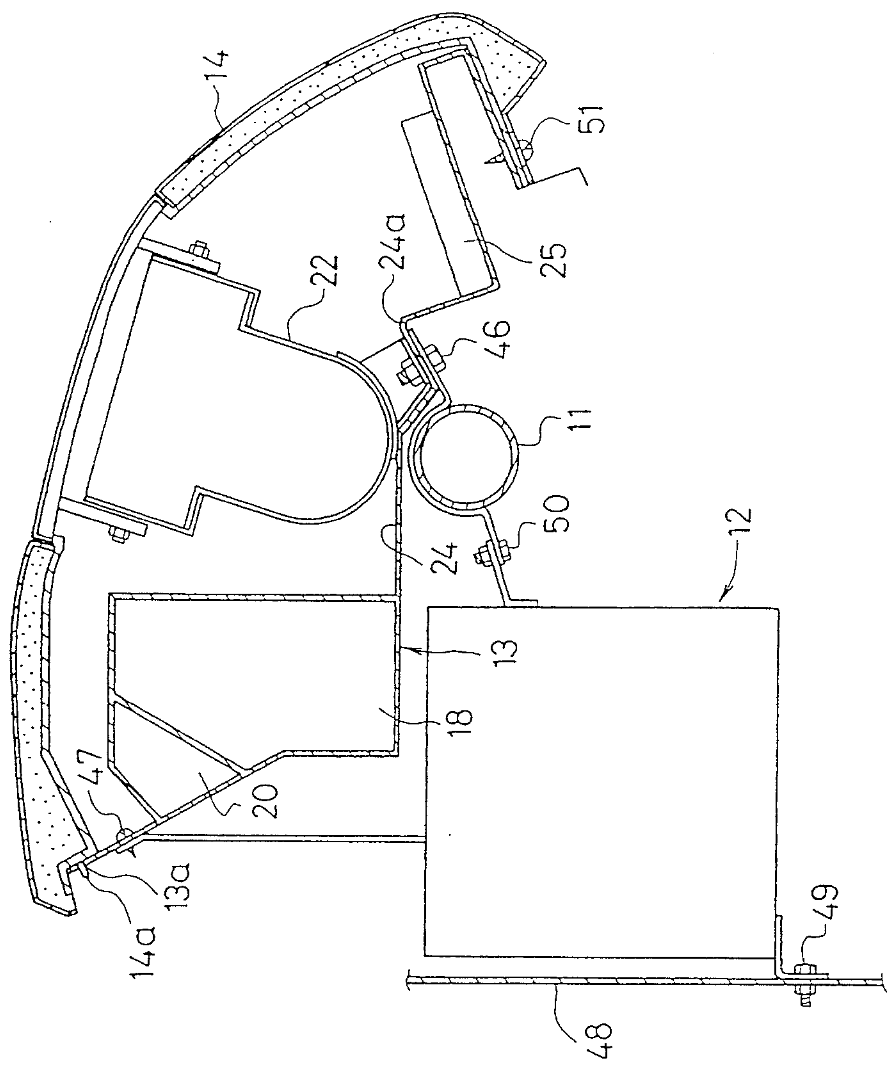
FIG. 7 is a sectional view taken on line D—D of FIG. 2.

As shown in FIG. 7, the air conditioning unit 12 is secured to the base member 13 by a screw 47, to a body panel 48 by a bolt 49 and to the steering member 11 by a bolt 50.

Also, as shown in FIG. 7, the instrument panel 14 is provided with a plurality of locating pins 14*a* projecting downwardly from an upper edge thereof. The locating pins 14*a* are inserted respectively into locating holes 13*a* formed in the base member 13, and a lower portion of the instrument panel 14 is attached to a lower portion of the base member 13 by a screw 51.

In FIG. 1, reference numeral 53 denotes a glove box, and 54, a center cluster.

The assembling of the instrument panel portion structure thus constructed will now be described.

First, the air conditioning unit 12 and the base member 13 are mounted on the steering member 11 before the steering member 11 is mounted on the vehicle body, the flat harness 25 is laid on the harness placing portion 26 of the base member 13, and the meter 21 and air bag device 22 are mounted on the meter and air bag device placing portions 23 and 24 of the base member 13, respectively.

Then, the brackets 11*a* on the opposite end portions of the steering member 11 assembly are attached to a front pillar inner of the vehicle body, not shown, by screws. At that time, the air conditioning unit 12 is also secured to the body panel 48 by the bolt 49.

Thereafter, the locating pins 14*a* of the instrument panel 14 are inserted into the locating holes 13*a* of the base member 13 so that the instrument panel 14 is correctly positioned, and a lower side of the instrument panel 14 is secured by the screw 51. Then, the grilles 33 to 38 are connected respectively to the blow-off ports 15*a* to 20*a* of the ducts 15 and 20. Also, the lid 45, the glove box 53, the cluster 54, etc. are arranged.

In such a construction as mentioned above, since the base member 13 is formed in the vehicle width direction over a generally entire width of the vehicle and the plurality of ducts 15 to 20 of a closed sectional structure are formed on the base member 13, physical strength of the base member 13 is high. Therefore, owing to the arrangement of this base member 13, the physical strength of that portion of the vehicle body where the instrument panel 14 is arranged, is increased for the sake of a possible side crush or collision of the vehicle.

Also, since the plurality of ducts 15 to 20 is integrally formed with the base member 13, the wiring operation of the ducts 15 to 20 is completed simply by arranging the base member 13 and thus, workability is good.

Moreover, since the air bag device 22 and the meter 21 are secured to the vehicle body side after they are preliminarily mounted on the base member 13, workability is good in respect of assembling of the air bas device 22 and meter 21.

Furthermore, since the base member 13. etc. are mounted on the vehicle body side after they are preliminarily mounted on the steering member 11, the so-called module mounting is possible with the use of a robot.

Also, since the flat harness 25 is arranged on the harness placing portion 26 formed on a rear edge portion of the base member 13, the wiring route can be simplified compared with one which is arranged along the vehicle body, the wiring operation is easy and the flat harness 25 itself can be made light in weight.

Moreover, by arranging the case upper portion 28 and case lower portion 29 on the opposite end portions of the harness placing portion 26, the connection of the connector connection of the flat harness 25 can be made easily. At the same time, by integrally forming the case upper portion 28 with the base member 13, the number of parts can be reduced. Since the case lower portion 29 can be attached to the case upper portion 28 by one touch, the attaching and detaching work can be made easily.

The size of the instrument panel 14 is changed if the type or model of a vehicle is different. However, since the base member 13 with which the plurality of ducts 15 to 20, etc. are integrally formed are formed as a separate body from the instrument panel 14, the base member 13 is not required to change the sizes in such a way corresponding to the side of the instrument panel 14. Therefore, since the same base member 13 can be commonly used even if the type or model of the vehicle is different, the base member 13 can be used commonly. In this case, by preliminarily preparing several kinds of connecting pipes 40 and 41, grilles 33, etc. of different configurations in accordance with the type or model of vehicles, the grilles 33 to 38 on the instrument panel 14 side can easily be connected to the blow-off ports 15*a* to 20*a* of the ducts 15 to 20 on the base member 13 side. In this embodiment, several kinds of connecting pipes 40 and 41 of different configurations are prepared on the side of the right-side ventilation grille 35, left-side ventilation grille 36, right-side defroster grille 37 and left-side defroster grille 38, and several kinds of grilles 33 and 34 themselves are preliminarily on the side of the center grille 34, so that the change of the type or model of vehicles is properly met.

If the connecting pipes 40 and 41 are formed in an accordion type so that they may have flexible properties, a single kind of grilles, etc. can be commonly used. In this embodiment, although the connecting pipes 40 and 41 are separate bodies, they may be integrally formed with the grille 35, etc. If the connecting pipes 40 and 41 are designed such that they have flexible properties, they can be integrally formed with the duct side.

Figure 9:
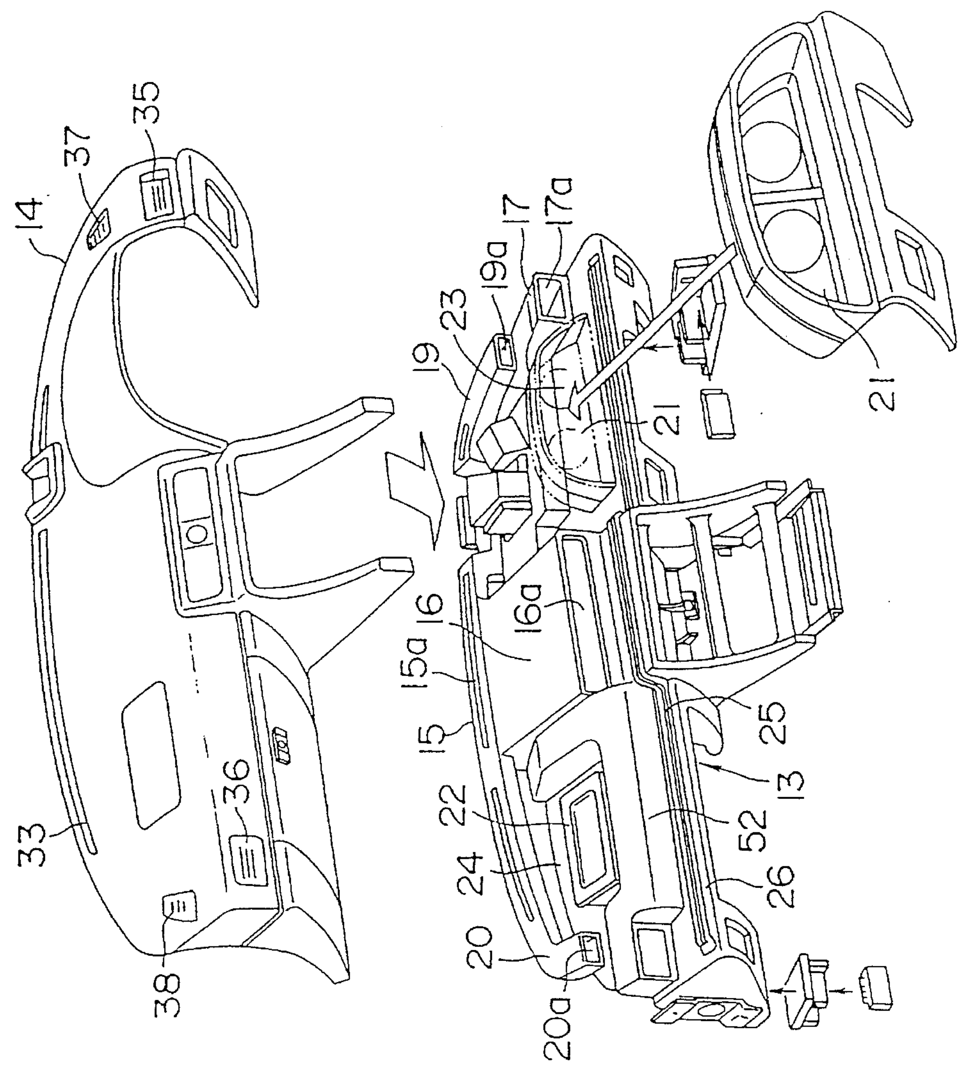
FIG. 9 is an exploded perspective view showing an instrument panel, a base member, etc. according to a second embodiment of the present invention.

FIG. 9 shows a second embodiment of the present invention.

This embodiment is different in wiring or extending position of the ducts compared with the first embodiment.

Specifically, the left-side ventilation duct 18 of the first embodiment is allowed to extend through a vehicle front side of the air bag device placing portion 24. On the other hand, the left-side ventilation duct 52 of this embodiment is allowed to extend through a vehicle rear side (i.e., this side when viewed from the side of a vehicle passenger) of the air bag device placing portion 24.

By allowing the left-side ventilation duct 52, this being of hollow interior, to extend on this side of the air bag device 22 in a way as mentioned above, the vehicle passenger(s) hits the duct 52 at an early stage of a vehicle collision so that the duct 52 is broken to absorb the impact from the vehicle collision.

Since the remaining construction and operation are the same as the first embodiment, a description thereof is omitted.

FIGS. 10 to 17 show a third embodiment of the present invention.

Figure 10:
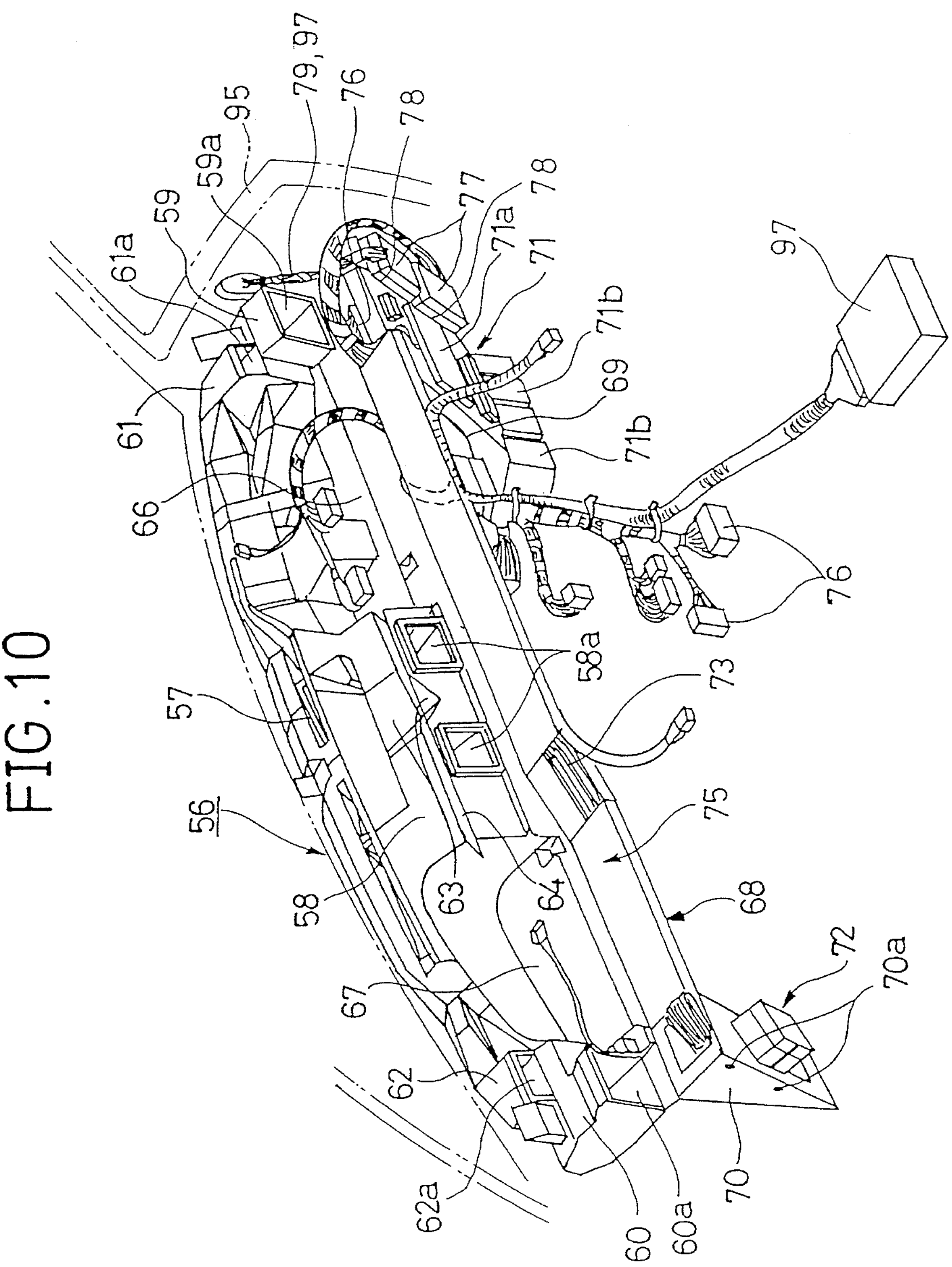
FIG. 10 is a perspective view showing a connector disposed at a base member according to a third embodiment of the present invention.
Figure 12:
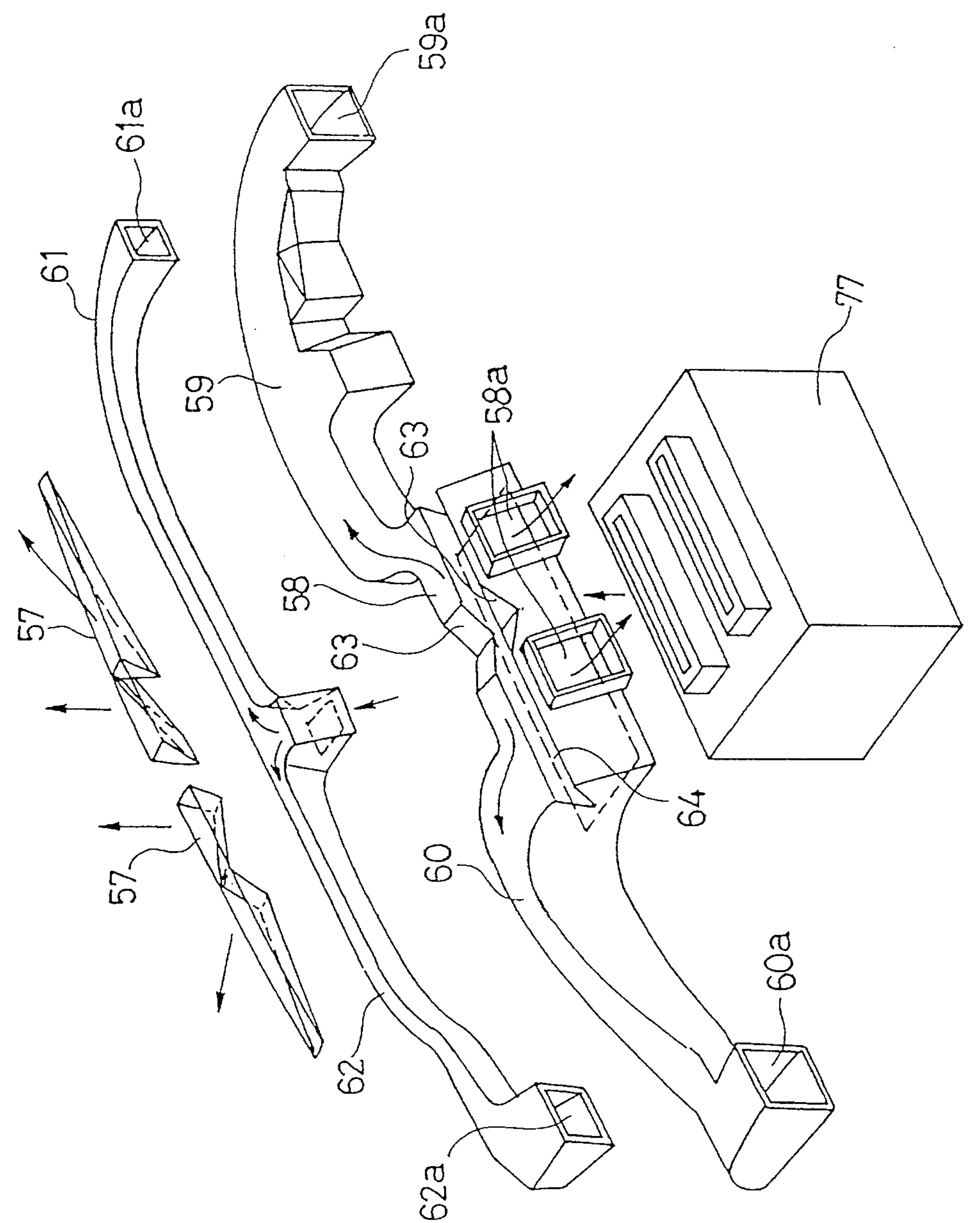
FIG. 12 is a perspective view showing a plurality of ducts of the base member according to the third embodiment of the present invention in an exploded state.

Integrally formed with a base member 56 of this embodiment are a front defroster duct 57, a center duct 58, a right-side ventilation duct 59, a left-side ventilation duct 60, a right-side defroster duct 61, and a left-side defroster duct 62 (see FIGS. 10 and 12, as well as elsewhere). FIG. 12 shows these ducts 57 to 62 in an exploded state only for the sake of easy understanding. Actually, however, adjacent ducts 57 to 62 are partitioned by a single wall and integrally formed with the base member 56.

A pair of blow-off ports 58*a* and 58*a* is formed in the center duct 58. A V-shaped groove is formed between the blow-off ports 58*a* and 58*a* in a forward and backward direction of the vehicle. A vehicle width V-shaped groove 64 generally perpendicular to this forward and backward V-shaped groove 63 is formed in a vehicle width direction (see FIGS. 10 and 12, as well as elsewhere).

A meter placing portion 66 and an air bag device placing portion 67 serving as the "electric equipment placing portion" on which the meter 21 and air bag device 22 serving as the "electric equipments" are formed on the base member 56. Also formed on this base member 56 is a harness placing portion 68 in a vehicle width direction over a generally entire width of the vehicle.

Figure 11:
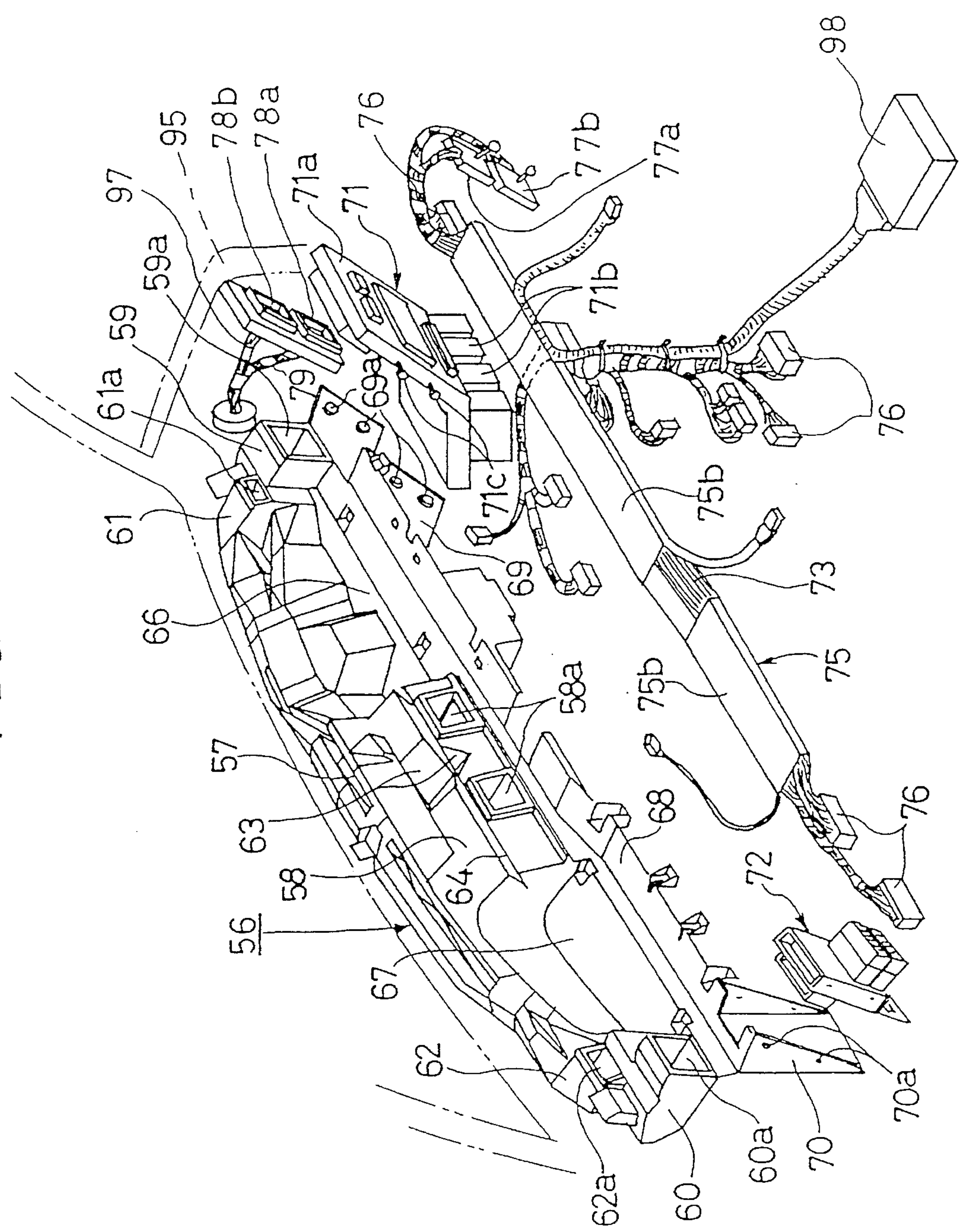
FIG. 11 is an exploded perspective view corresponding to FIG. 10.
Figure 13:
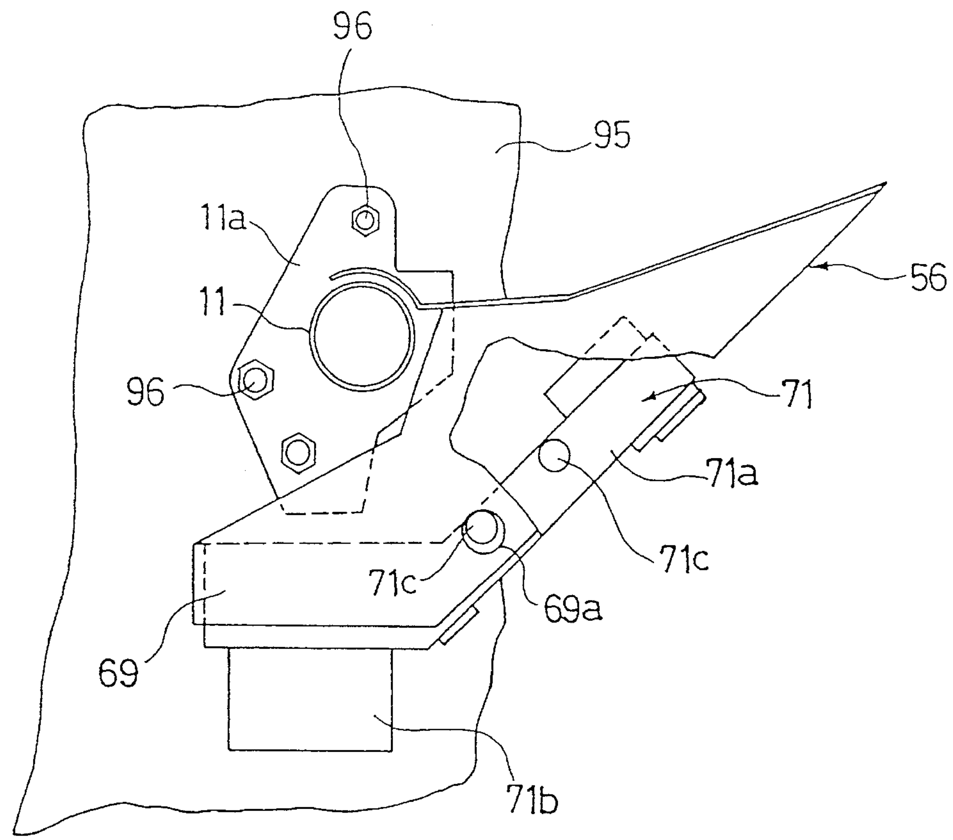
FIG. 13 is a side view showing a mounted state of an electronic part according to the third embodiment of the present invention.

As shown in FIG. 11, mounting brackets 69 and 70 are integrally formed on opposite end portions of the harness placing portion 68, so that electronic parts 71 and 72 are mounted on the mounting brackets 69 and 70, respectively. This electronic part 71 is designed such that an electronic unit 71*b* is detachably disposed on a fuse block 71*a*, so that a projection 71*c* projecting from this fuse block 71*a* is engaged in a mounting hole 69*a* of the mounting bracket portion 69 as shown in FIG. 13. The electronic part 72 is mounted in a mounting hole 70*a* of the mounting bracket portion 70 by screws, not shown, etc.

As shown in FIGS. 10 and 11, a projector 75 with a harness 73 formed of a round electric cord or wire received therein is placed on the harness placing portion 68.

Figure 15:
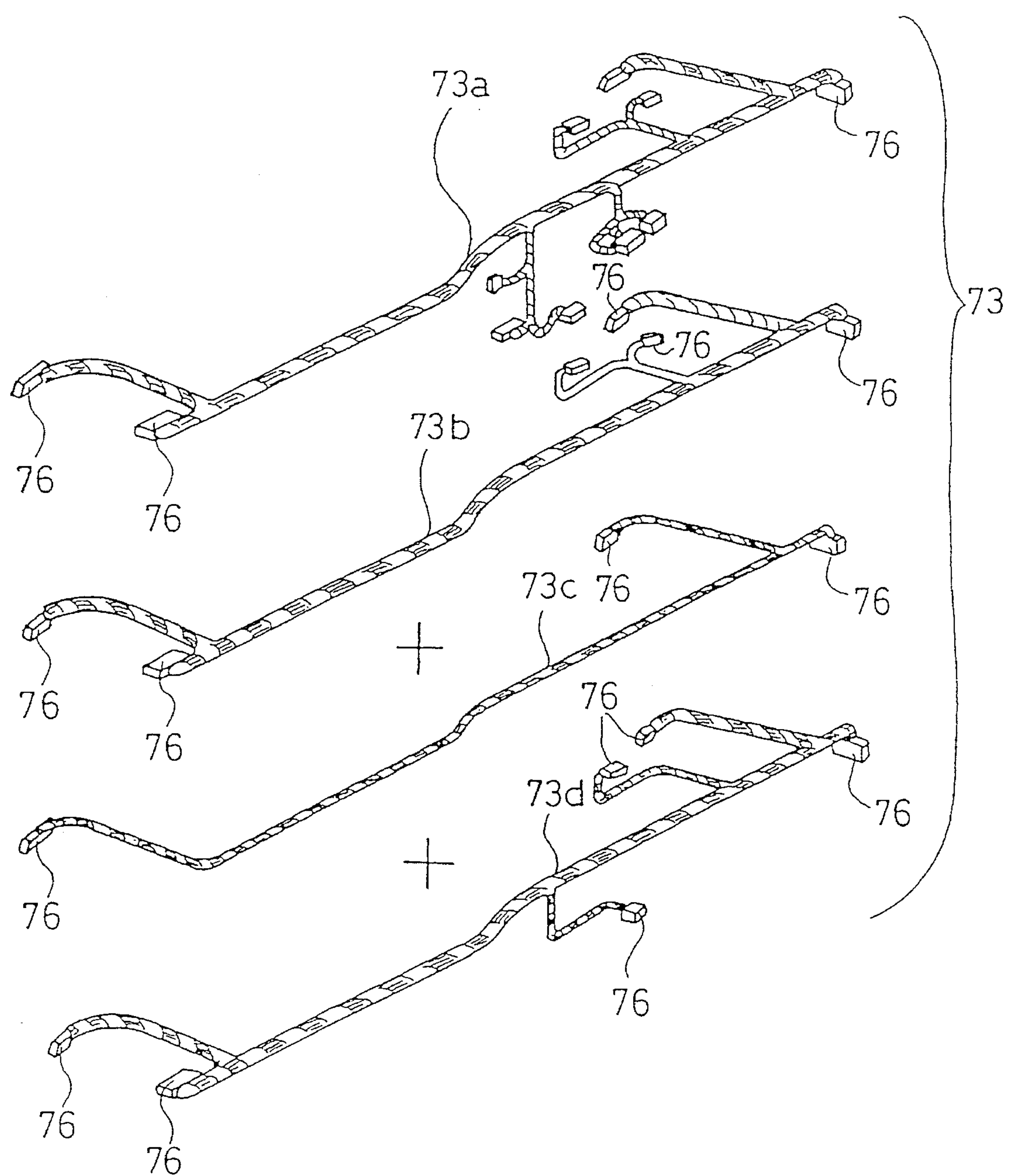
FIG. 15 is a view showing a common-use harness and a plurality of exclusive-use harnesses according to the third embodiment of the present invention.

As shown in FIG. 15, the harness 73 comprises a common-use harness 73*a* which is commonly used in various types or models of vehicles, and a plurality of exclusive-use harnesses 73*b*, 73*c* and 73*d* which become necessary in accordance with the user's request, etc.

As the common-use harness 73*a*, there are harnesses relating to a meter system, an air conditioning system, an engine system, a hard system, etc. On the other hand, as the exclusive-use harnesses, in FIG. 15, reference numeral 73*b* denotes a harness relating to an AT (automatic transmission system); 73*c*, a harness relating to an ASCD (auto speed control device); and 73*d*, a harness relating to an ABS (anti-skid brake system), respectively.

Figure 16:
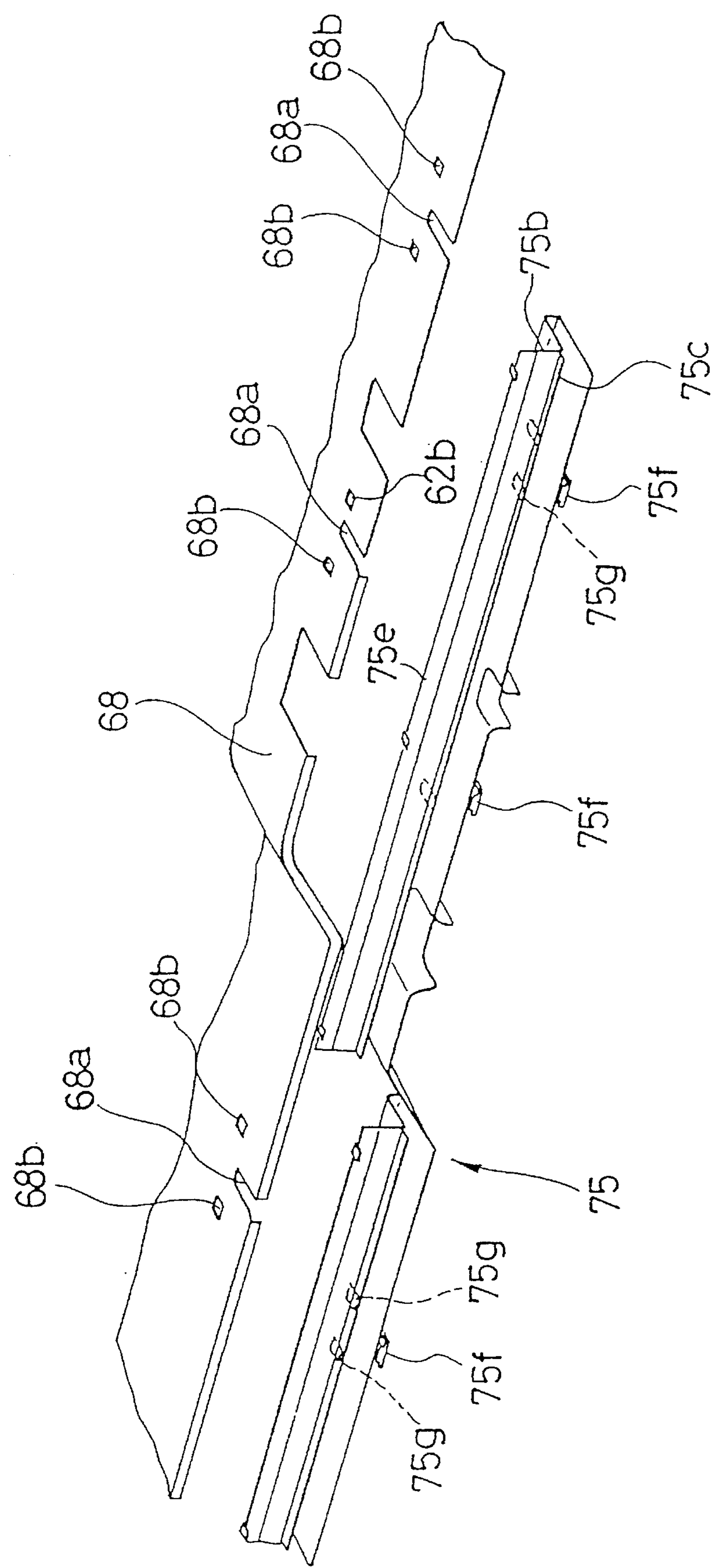
FIG. 16 is an exploded perspective view showing a harness placing portion and a protector according to the third embodiment of the present invention.
Figure 17:
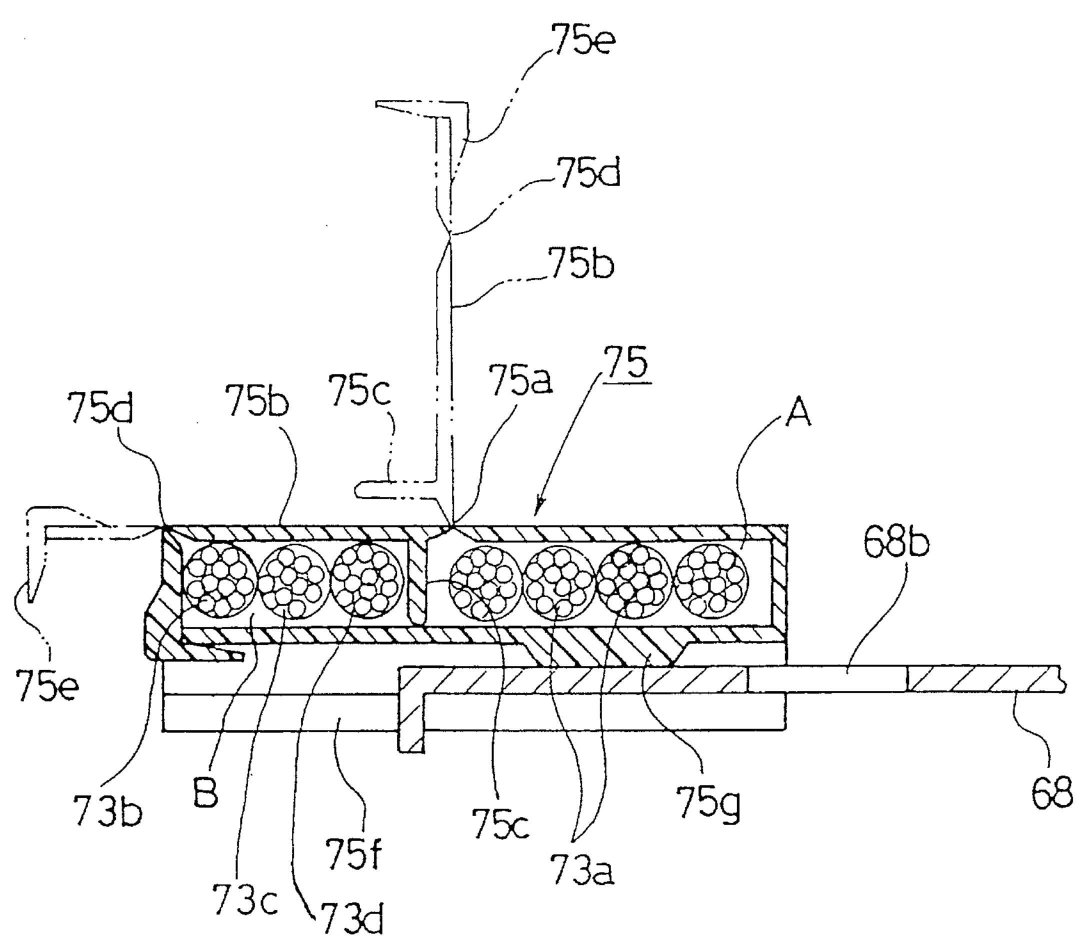
FIG. 17 is a sectional view showing harnesses arranged in a protector according to the third embodiment of the present invention.

As shown in FIGS. 16 and 17, the protector 75 for receiving the harness 73 is provided with a rotary body 75*b* which can be opened and closed through a hinge 75*a* having a small thickness. This rotary body 75*b* is provided with a partition wall 75*c* formed on a basal portion side thereof and also with a cover portion 75*e* formed on a distal end portion side thereof through a hinge 75*d* having a small thickness. When the rotary body 75*b* is in a closed condition as indicated by a solid line of FIG. 17, a common-use harness chamber side A for receiving the common-use harness 73*a* and an exclusive-use harness chamber side B for receiving optionally selected exclusive-use harnesses 73*b*, 73*c* and 73*d* are defined by the partition wall 75*c*.

The protector 75 is provided with engagement portions 75*f* each having a generally T-shaped configuration in section, which are formed on a lower surface portion side of the protector 75 so as to be inserted and engaged in a plurality of cut portions 68*a* of the harness placing portion 68. The protector 75 is also provided with elastically deformable fitting portions 75*g* formed likewise on the lower surface portion side thereof and adapted to be fitted in openings 68*b* formed in the harness placing portion 68 in order to provide an escape preventive function.

As shown in FIG. 15, a plurality of connectors 76 is provided on end portions of the harnesses 73, so that these connectors 76 are connected to the electronic parts 71 and 72, the meter 21, etc.

Some of the connectors 76 provided on end portions of the harnesses 73 of FIG. 15 comprise a split connector disclosed in Japanese Laid-Open Patent Publication No. Hei 3-226978. A plurality of such split connectors 76 is connected to each other to constitute male connectors 77*a* and

77*b*. This point is the same as the male connectors disclosed in the above Japanese Laid-Open Patent Publication No. Hei 3-226978.

The male connector 77*a* is connected to the female connector 78*a*, and the male connector 77*b* is connected to the female connector 78*b*. Needless to say, the female connectors 78*a* and 78*b* comprise a female connector disclosed in the above Japanese Laid-Open Patent Publication No. Hei 3-226978.

The female connector 78*a* is provided on one end of an engine room harness 79, and the other end of the engine room harness 79 is connected to a head lamp, a battery, not shown, etc. Similarly, the female connector 78*b* is provided on one end of the body harness 97, and the other end of the body harness 97 is connected to a tail lamp, electronic parts in a rear parcel, not shown, etc. Therefore, by connecting these connectors 77 and 78, the predetermined harness 73 among the harnesses 73*a* to 73*b* of FIG. 15 is connected to the engine room harness 79 and the body harness 97.

Figure 14:
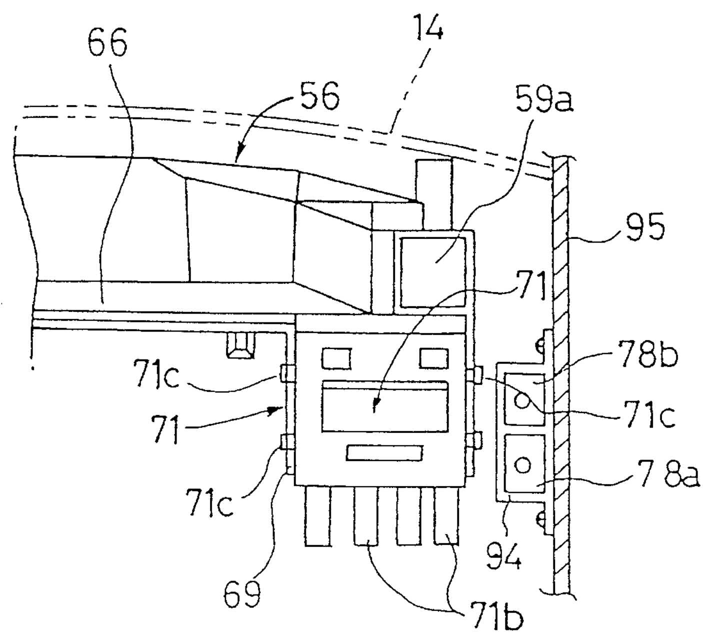
FIG. 14 is a front view showing a mounted state of an electronic part according to the third embodiment of the present invention.

As shown in FIG. 14, the female connectors 78*a* and 78*b* are arranged on a dash side panel 95 by a mounting bracket 94. This arrangement position as illustrated is situated at a location corresponding to the mounting bracket 69 of the base member 56 or a lower location of the base member 56. Owing to this arrangement, the operation performance for connection to the male connectors 77*a* and 77*b* become satisfactory because the female connectors 78*a* and 78*b* are located in the vicinity of the base member 56 of the dash side panel 95, when compared with an arrangement in which the female connectors 78*a* and 78*b* are arranged on the vehicle body side.

In FIG. 11, reference numeral 98 denotes an electronic part which is to be installed in a console box, not shown.

The base member 56 is constructed, as in the first embodiment, by separately forming the ducts 57 to 62 side and the placing portions 66 and 68 side by the low pressure injection molding method, and thereafter, they are welded by hot plate heat welding (a method for heating the face-to-face portions with a hot plate so as to be welded), vibration welding, supersonic welding, or the like.

Next, operation of the third embodiment will be described.

By forming the vehicle width V-shaped groove 64 in the base member 56 in a way as described, air blown upwardly from a heater unit 77 can be branched and guided, as shown in FIG. 12, to the blow-off ports 58*a* and 58*a* side of the center duct 58 and the blow-off ports 59*a* and 60*a* side of the side ventilation ducts 59 and 60, and the air can be blown off smoothly from the respective blow-off ports 58*a*, 58*a*, 59*a* and 60*a*.

Also, by forming the forward and backward V-shaped groove 63, air can be branched and guided, as shown in FIG. 12, to the right-side ventilation duct 59 side and the left-side ventilation duct 60 side with reference to the groove 63, and the air can be blown off smoothly from the blow-off port 59*a* side and the blow-off port 60*a* side.

For wiring the harness 73 of FIG. 15 on the harness placing portion 68 of the base member 56, first, the common-use harness 73*a* is received in the common-use harness side chamber A with the rotary body 75*b* held in the state as indicated by two-dots chain lines of FIG. 17, and the rotary body 75*b* is closed from that state as indicated by a solid line of FIG. 17. After the exclusive-use harnesses 73*b* are selected in accordance with the necessity for each vehicle and optional exclusive-use harnesses 73*b* are received in the exclusive-use harness side chamber B, the cover portion 75*e* is closed as indicated by a solid line of FIG. 17 to complete the wiring operation of the harness 73 to the protector 75. Thereafter, this protector 75 is attached to the harness placing portion 68 through the engagement portion 75*f* and the fitting portion 75*g*.

That is, if the common-use harnesses 73*a* commonly necessary for various types or models of vehicles are all preliminarily received in the protector 75 and then exclusive-use harnesses 73*b* required are selected so as to be received in the protector 75, a harness 73 corresponding to a certain vehicle can be set up immediately. Moreover, the harnesses 73*a* constituting the harness 73 are not required to be connected and bundled, and the connecting and bundling operation of the harnesses, which is conventionally practiced in the wiring operation of the harnesses to the vehicle body, is no more required. Since the protector 75 can be wired on the harness placing portion 68 by one touch, the wiring operation of the harnesses 73 is significantly enhanced.

Furthermore, by providing the mounting bracket portions 69 and 70 on the opposite end portions of the harness placing portion 68 and attaching the electronic parts 71 and 72 to the mounting brackets 69 and 70, the operation performance for arrangement is satisfactory because the electronic parts 71 and 72 are located this side, when compared with an arrangement in which the electronic parts 71 and 72 are arranged on the vehicle body side. Moreover, since the connectors 76 of the end portions of the harness 73 arranged on the harness placing portion 68 are attached to the electronic part 72 and the male connector 77 is attached to the female connector 78, the working performance for connection is more effective.

Since the remaining operation and effects are the same as the first embodiment, a description thereof is omitted.

FIGS. 18 to 21 show a fourth embodiment of the present invention.

The base member 80 of this embodiment is formed by low pressure injection molding and welding as in the above embodiments. The base member 80 has electric equipment placing portions 81 formed on opposite sides thereof. Openings 81*a* are formed in the electric part placing portions 81, respectively. Each of the electric equipment placing portions 81 is formed in a suitable configuration for either of the air bag device 22 for the assistant driver's seat and the meter 21 to be mounted thereon. The air bag device 22 for the assistant driver's seat is mounted on the steering member 11 through the opening 81*a* (see FIGS. 19 and 20).

Figure 18:
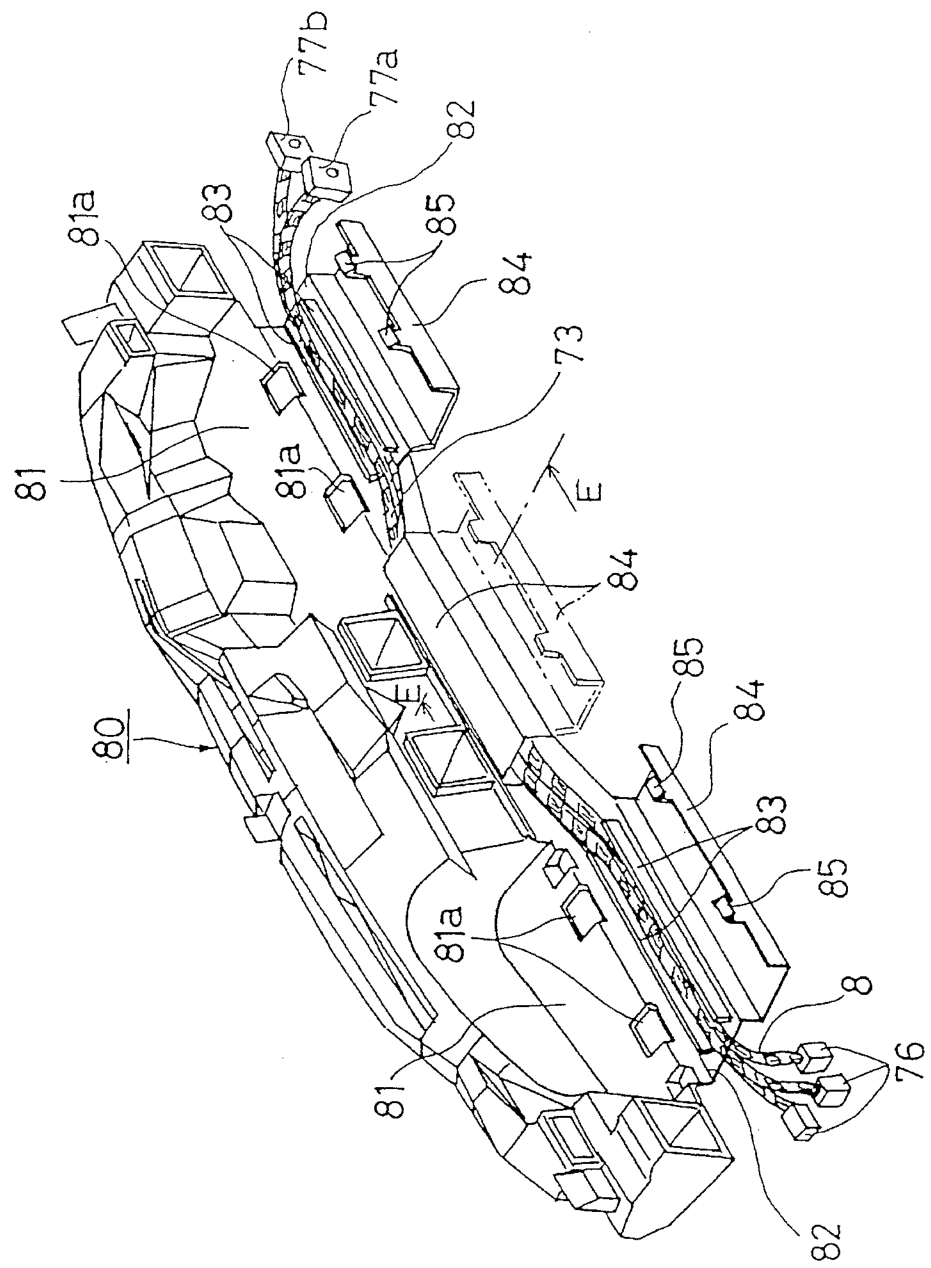
FIG. 18 is a perspective view showing a base member, etc. according to a fourth embodiment of the present invention.
Figure 19:
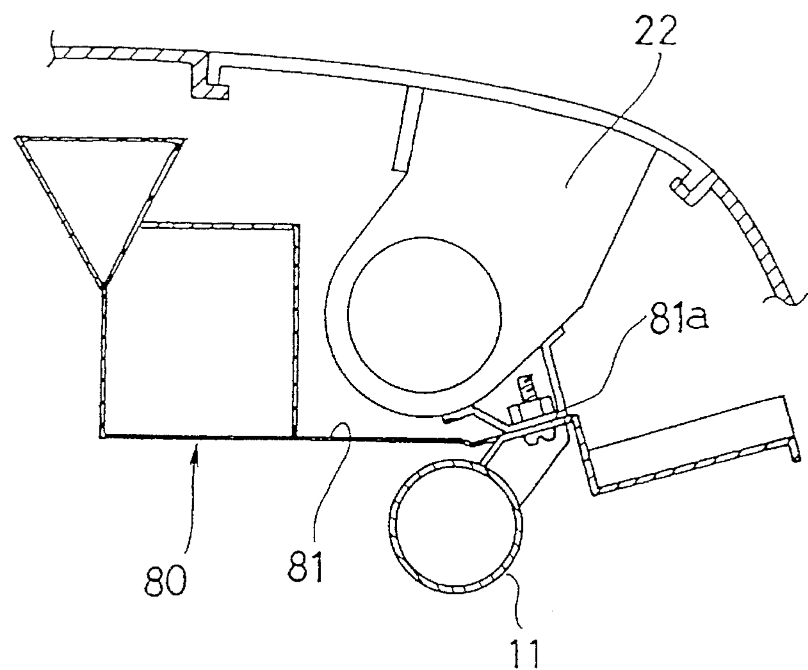
FIG. 19 is a sectional view showing an arrangement of an air bag device according to the fourth embodiment of the present invention.
Figure 20:
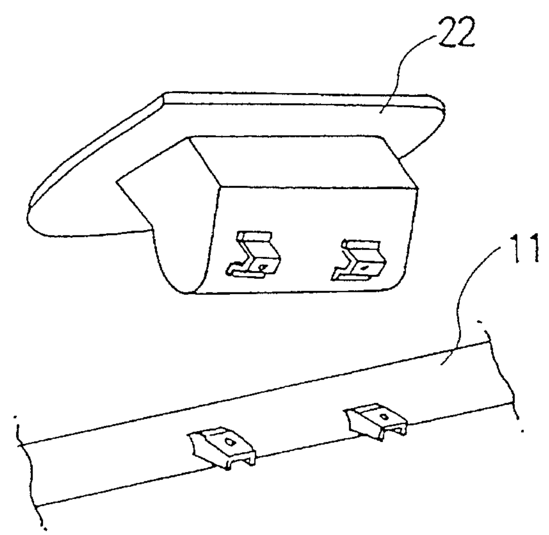
FIG. 20 is an exploded perspective view of an air bag device and a steering member according to the fourth embodiment of the present invention.
Figure 21:
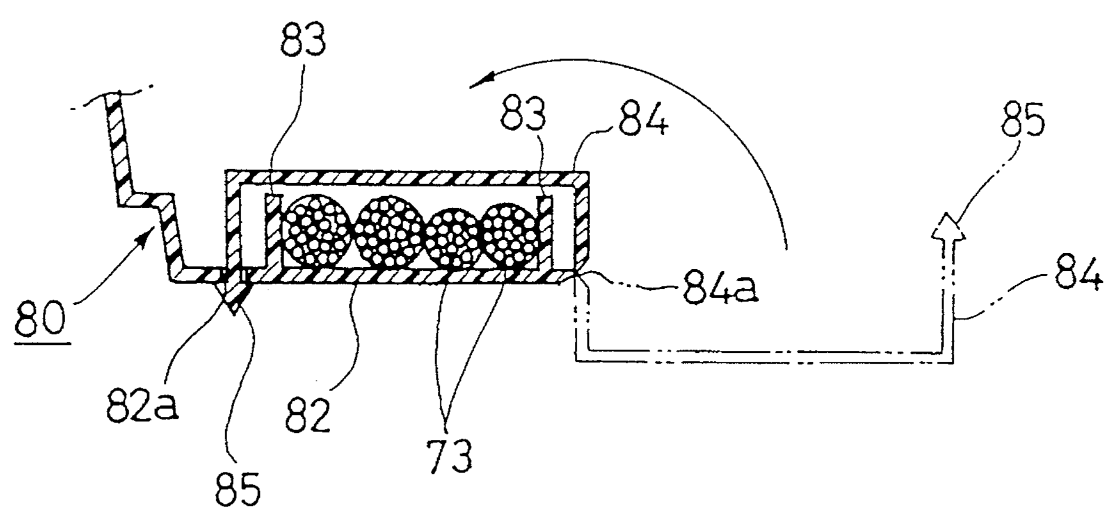
FIG. 21 is a sectional view taken on E—E of FIG. 18.

As shown in FIGS. 18 and 21, a pair of ribs 83 is formed on the harness placing portion 82 so that the harness 73 formed of a round electric wire is placed between the ribs 83. A cover 84 for opening and closing an upper part of the ribs 83 is also formed on the harness placing portion 82. This cover 84 has a generally U-shaped configuration in section and can be opened and closed by a hinge 8*a* having a small thickness. In a closed position, engagement projections 85 formed on a front end of the cover 84 is in engagement with engagement holes 82*a* of the harness placing portion 82 as shown in FIG. 21. The cover 84 is shaped in a location as indicated by two-dots chain lines of FIG. 21 in order to facilitate molding thereof.

Since either the air bag device 22 for the assistant driver's seat or the meter 21 can be placed on the electric equipment placing portion 81, the base member 80 can be applied to any of a right-handle vehicle and a left-handle vehicle and therefore, the number of parts can be reduced.

Since the remaining construction and operation are the same as the first embodiment, a description thereof is omitted.

Figure 22:
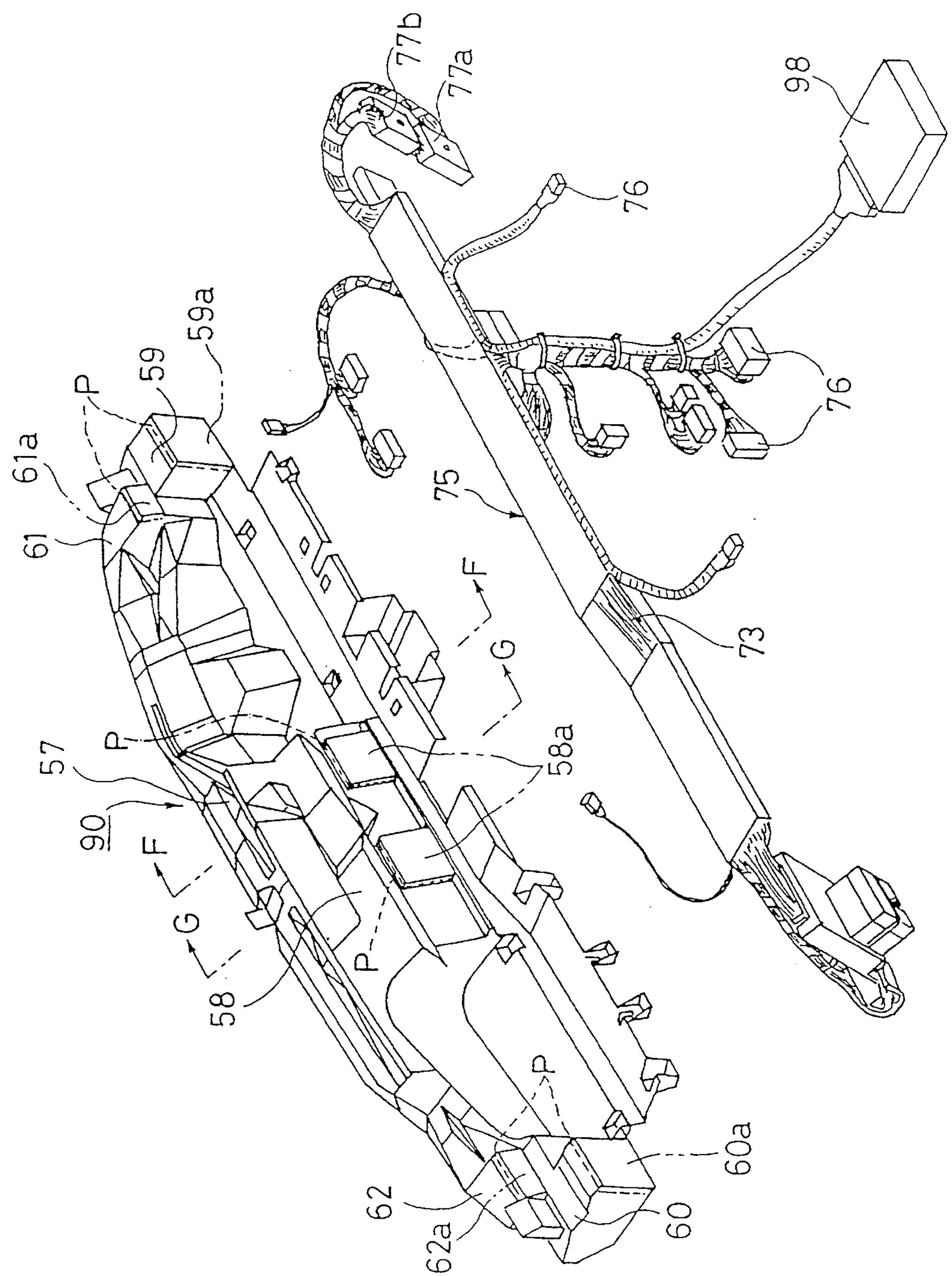
FIG. 22 is an exploded perspective view corresponding to FIG. 11, according to a fifth embodiment of the present invention.
Figure 23:
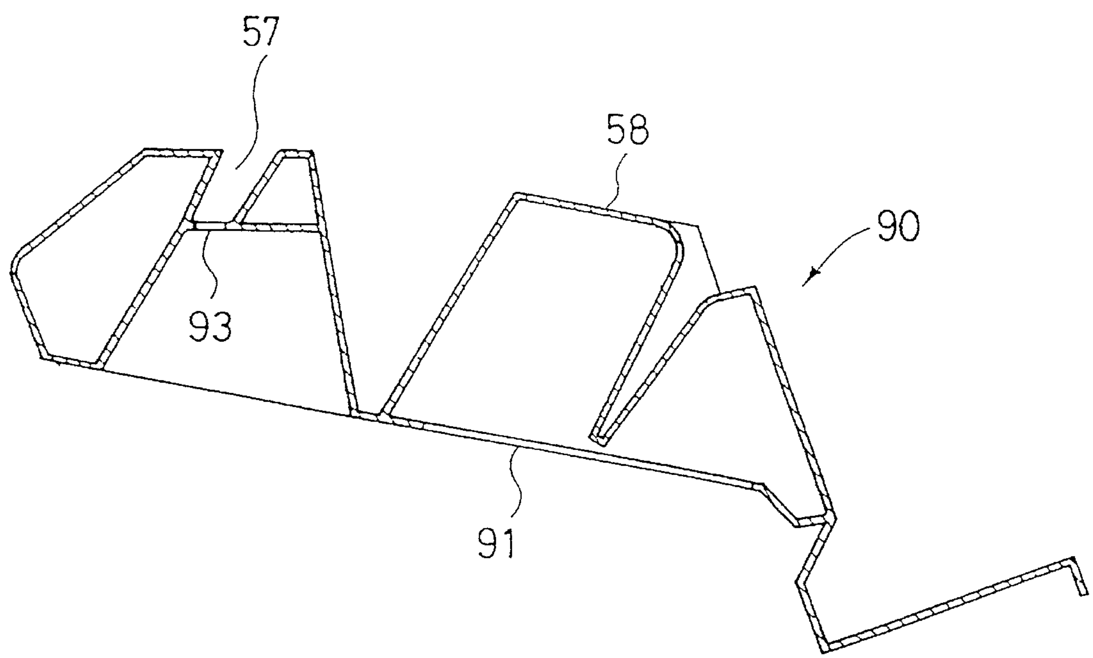
FIG. 23 is a sectional view taken on line F—F of FIG. 22.
Figure 24:
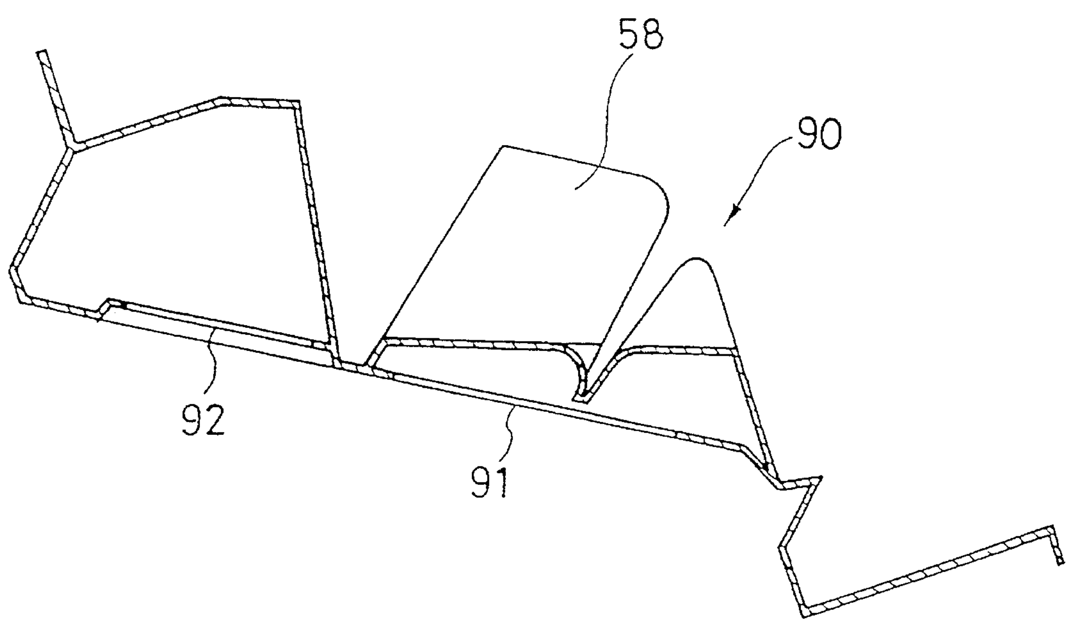
FIG. 24 is a sectional view taken on line G—G of FIG. 22.
Figure 25:
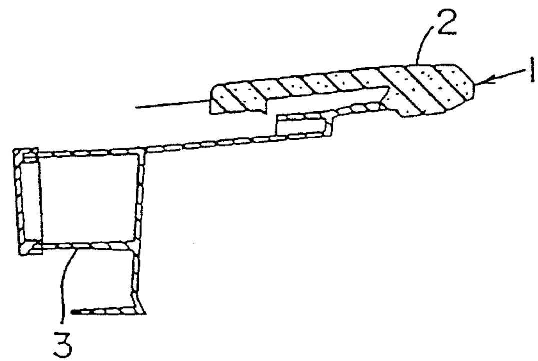
FIG. 25 is a sectional view according to one example of the prior art.
Figure 26:
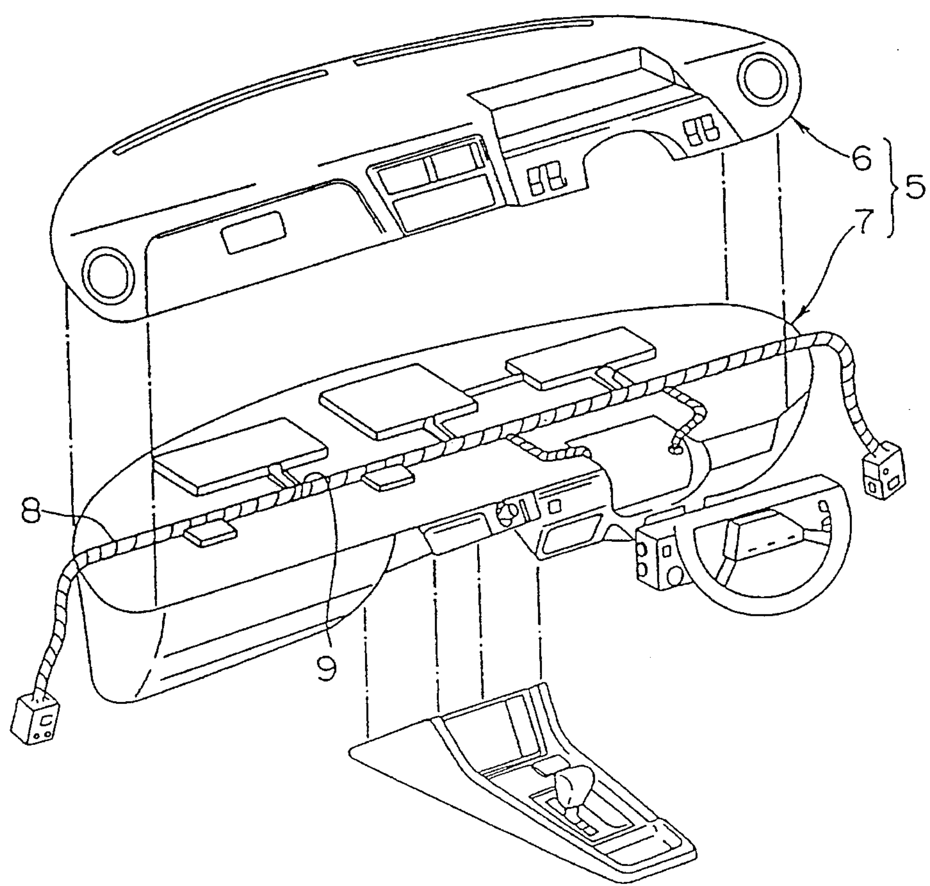
FIG. 26 is a perspective view corresponding to FIG. 25, according to another example of the prior art.

FIGS. 22 to 24 show a fifth embodiment of the present invention.

In this embodiment, the base member 90 is integrally formed by blowing. The configuration is generally the same as the third embodiment of FIGS. 10 to 17, except that the mounting brackets 69 and 70 are not formed on the opposite end portions of the harness placing portion 68.

In this base member 90, the ducts 57 to 62 are cut along a cutting line P indicated by broken lines of FIG. 22 during a trimming process after blowing and, thereby, the blow-off ports 58*a*, 59*a*, 60*a*, 61*a* and 62*a* are formed. By changing the location of this cutting line P, any change of the location of the respective grilles on the instrument panel can be coped with. Similarly, during the trimming process, openings 91, 92 and 93 of FIGS. 23 and 24 are formed.

As described in the foregoing, according to the present invention, the base member with which the ducts are integrally formed is a separate body from the instrument panel. Since the base member is not required to be changed copping with any change of the instrument panel, the ducts can be commonly used. Moreover, since the ducts each having a closed structure in section are formed on the base member, the base member has a predetermined strength. Since this base member is laid in the vehicle width direction over the generally entire width of the vehicle, the instrument panel arrangement portion is increased in strength by this base member for the sake of a possible side crush or collision of the vehicle.

Since the electric equipment placing portion and the harness placing portion are integrally formed, if the electric equipments and harnesses are mounted on these placing portions and thereafter the base member is mounted on the vehicle body, these electric equipments, etc. can be arranged at a time (or by one action). Accordingly, workability is increased compared with the conventional case where electric equipments are arranged in a narrow vehicle body.

Owing to the arrangement of the selected duct extending from the electric equipment placing portion through the back of the vehicle, the vehicle passenger hits the hollow duct before he hits the electric equipments. Accordingly, the impact from the vehicle collision can be absorbed by deformation of the duct.

By forming the V-shaped groove in the center duct on the upper surface portion side, air drawn from below the center duct is branched to the right-side ventilation duct side and the left-side ventilation duct side. Since the air is reduced in flow resistance, it can be blown off smoothly from the blow-off ports.

By forming the harness placing portion on the vehicle rear side edge portion of the base member, the operation for replacing the harness, etc. can be made easily.

By providing the connectors at location in the vicinity of the end portion of the harness placing portion of the harness which is placed on the harness placing portion of the base member, the operation for connecting these connectors to those connectors on the vehicle body side can be performed this side. Accordingly, the workability of connecting operation is good.

By detachably attaching the harness protector with the harnesses received therein to the harness placing portion of the base member, workability of wiring operation and, particularly, of a harness of a round electric wire is good.

By integrally forming a rotatable cover for covering the harnesses, which are placed on the harness placing portion, with the harness placing portion, it is not necessary to manufacture the harness protector separately. Moreover, molding is simple and workability of wiring operation of the harnesses is good.

By providing the mounting brackets on the end portions of the harness placing portion and mounting the electronic parts on the mounting brackets, workability of an arranging operation is good because the electronic parts are located this side compared with the conventional structure where the electronic parts are separately arranged on the vehicle body side. Moreover, if the connectors on the end portions of the harnesses placed on the harness placing portion are mounted on the electronic parts, workability of a connecting a operation becomes excellent.

By forming the electric equipment placing portions of the base member on the opposite sides of the vehicle central portion so that the meter can be placed on one of the electric equipment placing portion and the air bag device for the assistant driver's seat can be placed on the other electric equipment placing portion, the base member can suitably be used for both the right handle vehicle and the left handle vehicle.

By separately forming the plurality of portions in accordance with the low pressure injection molding method and forming the base member by welding those portions, a thickness management can be performed with high accuracy.

Particularly, if the thickness management of the duct portion can be made properly, a light-weight can be obtained by reducing the thickness.

By mounting the base member on the steering member which is laid in the vehicle width direction and whose opposite end portions are mounted on the vehicle body, if the steering member is mounted on the vehicle body after the base member is preliminarily mounted on the steering member, the so-called module mounting can be made and, therefore, the workability of assembling operation is more improved.

If the plurality of grilles is arranged on the instrument panel and the grilles are connected to the blow-off ports of the plurality of ducts, the base member with which the ducts are integrally formed is a separate body from the instrument panel. Accordingly, even in the case where the size of this instrument panel is changed, the blow-off ports of the ducts and the grilles can easily be connected to each other with the use of suitable connecting pipes having different configurations. Accordingly, since the base member is not required to correspond to the instrument panel, the ducts can be used commonly.

If the connecting pipe is formed in a way as having a flexible property, it is enough to prepare only one kind of connecting pipe. This is practically very useful.

What is claimed is:

1. A structure for use in vehicles comprising:

a base member laid in a space, defined between an instrument panel and a vehicle body panel, in a vehicle width direction over a substantially entire width of a vehicle, a plurality of ducts integrally formed with said base member, an electric equipment placing portion on which electric equipments are mounted integrally formed with said base member, a substantially horizontally extending, shelf-shaped harness placing portion, on which a harness, defined by a plurality of wires, is placed, formed in the vehicle width direction over said substantially entire width of said vehicle and integrally formed with the base member on a vehicle rear side edge portion thereof, and a harness protector, defining a rectangular cross-section with said harness received therein, detachably attached to said harness placing portion formed on said base member.

2. A structure for use in vehicles according to claim 1, wherein the plurality of ducts includes a center duct disposed on a central portion in a manner as to extend in the vehicle width direction and having a blow-off port for blowing off air backwardly, a right-side ventilation duct continuously extending rightwardly from said center duct and having a blow-off port at a front end portion thereof, and a left-side ventilation duct continuously extending leftwardly from said center duct and having a blow-off port at a front end portion thereof, air drawn upwardly from a lower side of said center duct being blown off from said blow-off port of said center duct and said blow-off ports of said side ventilation ducts, a V-shaped groove projecting downwardly and extending in a forward and backward direction of the vehicle being formed in an upper surface portion side of said center duct, the air drawn into said center duct from the lower side thereof being branched to said right-side ventilation duct side and said left-side ventilation duct side through said V-shaped groove.

3. A structure for use in vehicles according to claim 1, wherein a mounting bracket portion for mounting electronic parts thereon is provided on each end portion of said harness placing portion of said base member in the vehicle width direction.

4. A structure according to claim 1, wherein said harness protector comprises a rotary body, a first hinge, having a small thickness, permitting said rotary body to be opened and closed, a partition wall formed on a basal portion side of said rotary body, a cover portion formed on a distal end portion side of said rotary body, and a second hinge, having a small thickness, permitting said cover portion to be opened and closed.

5. A structure according to claim 4, wherein, when the rotary body is closed, a common-use harness chamber side, for receiving a common-use harness, and an exclusive-use harness chamber side, for receiving at least one optionally selected exclusive-use harness, are defined by the partition wall.

6. A structure according to claim 1, wherein said harness protector is provided with engagement portions, each having a generally T-shaped configuration in section, formed on a lower surface portion side of the harness protector, a plurality of cut portions, defined in the harness placing portion, into which said engagement portions can be inserted and with which said engagement portions can be engaged, and elastically deformable fitting portions formed on the lower surface portion side of the harness protector and adapted to be fitted in openings formed in the harness placing portion to provide an escape preventing function.

7. A structure according to claim 1, and further comprising mounting brackets for mounting electronic parts on said base member, and a plurality of connectors provided on end portions of the harness so as to be connected to said electronic parts, wherein at least one opening for drawing out an end portion of the harness is formed in an end portion of the harness protector.

* * * * *